US011731652B2

(12) United States Patent
Dolben et al.

(10) Patent No.: US 11,731,652 B2
(45) Date of Patent: Aug. 22, 2023

(54) SYSTEMS AND METHODS FOR REACTIVE AGENT SIMULATION

(71) Applicant: Woven Planet North America, Inc., Los Altos, CA (US)

(72) Inventors: David Andrew Dolben, San Francisco, CA (US); Chih Chi Hu, Mountain View, CA (US); Peter Ondruska, London (GB)

(73) Assignee: Woven Planet North America, Inc., Los Altos, CA (US)

( * ) Notice: Subject to any disclaimer, the term of this patent is extended or adjusted under 35 U.S.C. 154(b) by 336 days.

(21) Appl. No.: 17/122,974

(22) Filed: Dec. 15, 2020

(65) Prior Publication Data
US 2022/0185323 A1 Jun. 16, 2022

(51) Int. Cl.
*B60W 60/00* (2020.01)
*G06N 20/00* (2019.01)
*B60W 50/04* (2006.01)
*B60W 30/09* (2012.01)
*G06N 5/01* (2023.01)

(52) U.S. Cl.
CPC ........ *B60W 60/0011* (2020.02); *B60W 30/09* (2013.01); *B60W 50/045* (2013.01); *G06N 20/00* (2019.01); *B60W 2554/404* (2020.02); *G06N 5/01* (2023.01)

(58) Field of Classification Search
None
See application file for complete search history.

(56) References Cited

U.S. PATENT DOCUMENTS

| | | | | |
|---|---|---|---|---|
| 10,169,680 B1* | 1/2019 | Sachdeva | ............... | G06N 3/045 |
| 11,415,992 B2* | 8/2022 | Omari | .................. | G05D 1/0212 |
| 11,529,968 B1* | 12/2022 | Schaeffer | ................. | B60R 1/22 |
| 11,644,842 B1* | 5/2023 | Phan | .................... | G05D 1/0236 |
| | | | | 701/23 |
| 2019/0004518 A1* | 1/2019 | Zhou | ........................ | G06N 7/01 |
| 2020/0074266 A1* | 3/2020 | Peake | ................. | G06F 18/2411 |
| 2020/0409378 A1* | 12/2020 | Benisch | ............... | G05D 1/0088 |
| 2021/0403034 A1* | 12/2021 | Lapin | ................. | B60W 60/0011 |
| 2021/0403035 A1* | 12/2021 | Danna | ............... | B60W 60/0011 |
| 2022/0048535 A1* | 2/2022 | Niendorf | ................ | G06N 3/045 |
| 2022/0055640 A1* | 2/2022 | Wolff | ..................... | G06N 20/00 |

(Continued)

FOREIGN PATENT DOCUMENTS

WO WO-2022101452 A1 * 5/2022 ............. G06N 20/00

*Primary Examiner* — Thomas E Worden
(74) *Attorney, Agent, or Firm* — Christopher G. Darrow; Darrow Mustafa PC

(57) ABSTRACT

Systems, methods, and non-transitory computer-readable media can determine contextual information associated with an environment including a vehicle and at least one agent for generating a computer simulation based on the environment. One or more behavior constraints for the at least one agent can be determined based on the contextual information. A set of trajectories can be generated based on the one or more behavior constraints. A trajectory can be selected from the set of trajectories based on determining that the trajectory satisfies one or more predetermined criteria. The computer simulation can be generated, wherein the computer simulation includes monitoring driving behavior of the vehicle in response to the vehicle interacting with the at least one agent based on the selected trajectory.

17 Claims, 12 Drawing Sheets

(56) References Cited

U.S. PATENT DOCUMENTS

2022/0066459 A1* 3/2022 Jain ................. G05D 1/027
2022/0101105 A1* 3/2022 Mezghanni ............ G06F 30/27
2022/0188667 A1* 6/2022 Burisch ................. G08G 1/166
2022/0189312 A1* 6/2022 Ma ..................... G06N 3/044

* cited by examiner

SYSTEMS AND METHODS FOR REACTIVE AGENT SIMULATION

FIELD OF THE INVENTION

The present technology relates to autonomous vehicle systems. More particularly, the present technology relates to computerized simulations of reactive agents.

BACKGROUND

Vehicles are increasingly being equipped with intelligent features that allow them to monitor their surroundings and make informed decisions on how to react. Such vehicles, whether autonomously, semi-autonomously, or sometimes manually driven, may be capable of sensing their environment and navigating with little or no human input as appropriate. The vehicle may include a variety of systems and subsystems for enabling the vehicle to determine its surroundings so that it may safely navigate to target destinations or assist a human driver, if one is present, with doing the same. As one example, the vehicle may have a computing system (e.g., one or more central processing units, graphical processing units, memory, storage, etc.) for controlling various operations of the vehicle, such as driving and navigating. To that end, the computing system may process data from one or more sensors. For example, a vehicle may have sensors that can recognize hazards, roads, lane markings, traffic signals, and the like. Data from sensors may be used to, for example, safely drive the vehicle, activate certain safety features (e.g., automatic braking), and generate alerts about potential hazards.

SUMMARY

Various embodiments of the present technology can include systems, methods, and non-transitory computer readable media configured to determine contextual information associated with an environment including a vehicle and at least one agent for generating a computer simulation based on the environment. One or more behavior constraints for the at least one agent can be determined based on the contextual information. A set of trajectories can be generated based on the one or more behavior constraints. A trajectory can be selected from the set of trajectories based on determining that the trajectory satisfies one or more predetermined criteria. The computer simulation can be generated, wherein the computer simulation includes monitoring driving behavior of the vehicle in response to the vehicle interacting with the at least one agent based on the selected trajectory.

In an embodiment, the selecting the trajectory from the set of trajectories is further based on one or more scores associated with each trajectory of the set of trajectories and wherein each score is determined based on whether the trajectory satisfies the one or more predetermined criteria.

In an embodiment, the monitored driving behavior is based on generating one or more trajectories for the vehicle based on the interaction with the selected trajectory of the agent.

In an embodiment, the generating the set of trajectories for the at least one agent is based on a combination of at least two agent models comprising: a naïve agent model, a heuristic agent model, or a machine learning agent model, wherein the at least two agent models are weighted.

In an embodiment, the set of trajectories is further based on contextual information and a desired behavior generated by collected sensor data from human driven vehicles.

In an embodiment, the computer simulation involves a change in the environment, the one or more behavior constraints for the at least one agent change based on the change in the environment, and the set of trajectories change based on the one or more changed behavior constraints.

In an embodiment, the change in the environment is associated with an event in the environment, the one or more changed behavior constraints are based on the event, and the set of changed trajectories are based on the event.

In an embodiment, the generating the computer simulation is based on instructions for control of the at least one agent based on the selected trajectory and at least one of a movement of the at least one agent or a position of the at least one agent.

In an embodiment, performance of the vehicle can be determined based on performance criteria associated with the driving behavior of the vehicle. Whether the vehicle satisfies the performance criteria can be determined. The contextual information associated with whether the vehicle satisfies the performance criteria can be identified. The computer simulation can be regenerated based on the at least one agent and the identified contextual information.

In an embodiment, the contextual information is associated with at least one of: a boundary, an obstacle, or a limitation in the environment.

Figure 1A:
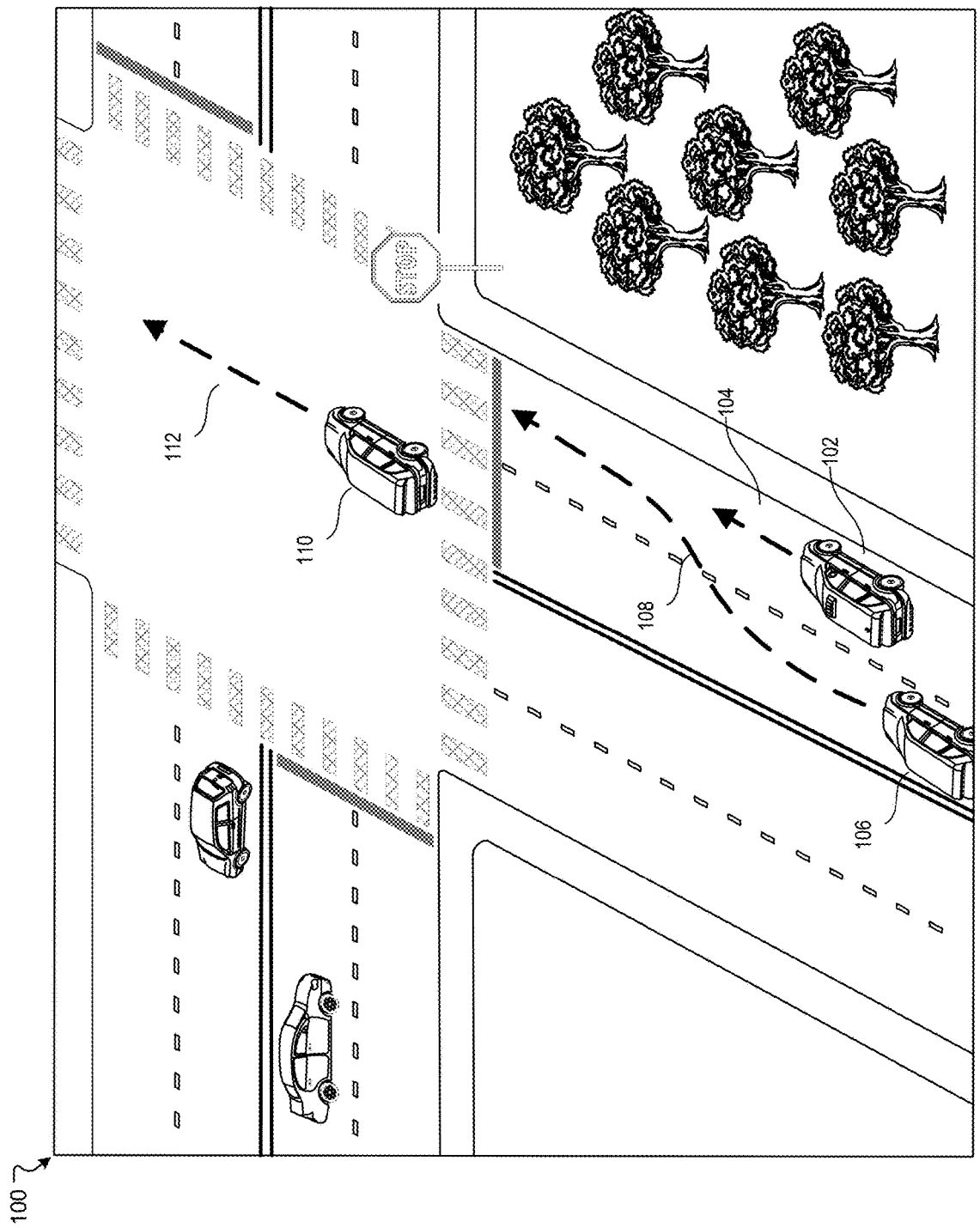
FIG. 1A-1D illustrate example scenarios demonstrating various challenges that may be experienced in conventional approaches to autonomous vehicle (AV) simulation.

The figures depict various embodiments of the present technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Vehicles are increasingly being equipped with intelligent features that allow them to monitor their surroundings and make informed decisions on how to react. Such vehicles, whether autonomously, semi-autonomously, or sometimes manually driven, may be capable of sensing their environment and navigating with little or no human input. The vehicle may include a variety of systems and subsystems for enabling the vehicle to determine its surroundings so that it may safely navigate to target destinations or assist a human driver, if one is present, with doing the same. As one example, the vehicle may have a computing system for controlling various operations of the vehicle, such as driving and navigating. To that end, the computing system may process data from one or more sensors. For example, a vehicle may have one or more sensors or sensor systems that can recognize hazards, roads, lane markings, traffic signals, etc. Data from sensors may be used to, for example, safely drive the vehicle, activate certain safety features (e.g., automatic braking), and generate alerts about potential hazards.

Autonomous vehicle (AV) systems undergo rigorous testing to ensure appropriate AV behavior in different scenarios. In some cases, the AV systems are tested in real-world (or real-life) settings. In real-world settings, AV systems should encounter a wide array of various scenarios to test the efficacy and safety of the AV systems. However, testing the AV systems in real-world settings can be challenging because certain scenarios can be difficult to encounter in a real-world setting. As such, computer simulation is an important aspect for testing the AV systems. Computer simulations allow for regular testing of the AV systems in scenarios that are difficult to encounter in a real-world setting. However, conventional approaches for computer simulations of scenarios fail to accurately provide realistic scenarios as they would be encountered in real-world settings.

For example, FIG. 1A illustrates an example scenario 100 in which a first vehicle 102, a second vehicle 106, and a third vehicle 110 are travelling on a road. In the example scenario 100, the first vehicle 102 and the second vehicle 106 are in close proximity to one another while travelling in the same direction in adjacent lanes. Further ahead of the first vehicle 102 and the second vehicle 106, the third vehicle 110 is also travelling in the same direction. In the example scenario 100, the first vehicle 102 is travelling straight by following a first path 104, and the third vehicle is travelling straight by following a third path 112. The third vehicle 110 is accelerating after stopping at a stop sign on the road. In following a second path 108, the second vehicle 106 cuts in front of the first vehicle 102 and stops at the stop sign. Thus, a failure by the first vehicle 102 to appropriately evaluate and respond to the second vehicle 106 following the second path 108 may result in a dangerous collision. The example scenario 100 is a scenario that would likely be difficult to regularly and predictably encounter in real-world settings. As a result, testing of an AV system in the example scenario 100 in a real-world setting is difficult to achieve. Accordingly, the example scenario 100 illustrates a scenario where computerized simulation of the scenario would be useful for testing an AV system. However, as described in further detail below, conventional approaches for simulating scenarios, such as the scenario 110, face many challenges.

Figure 1B:
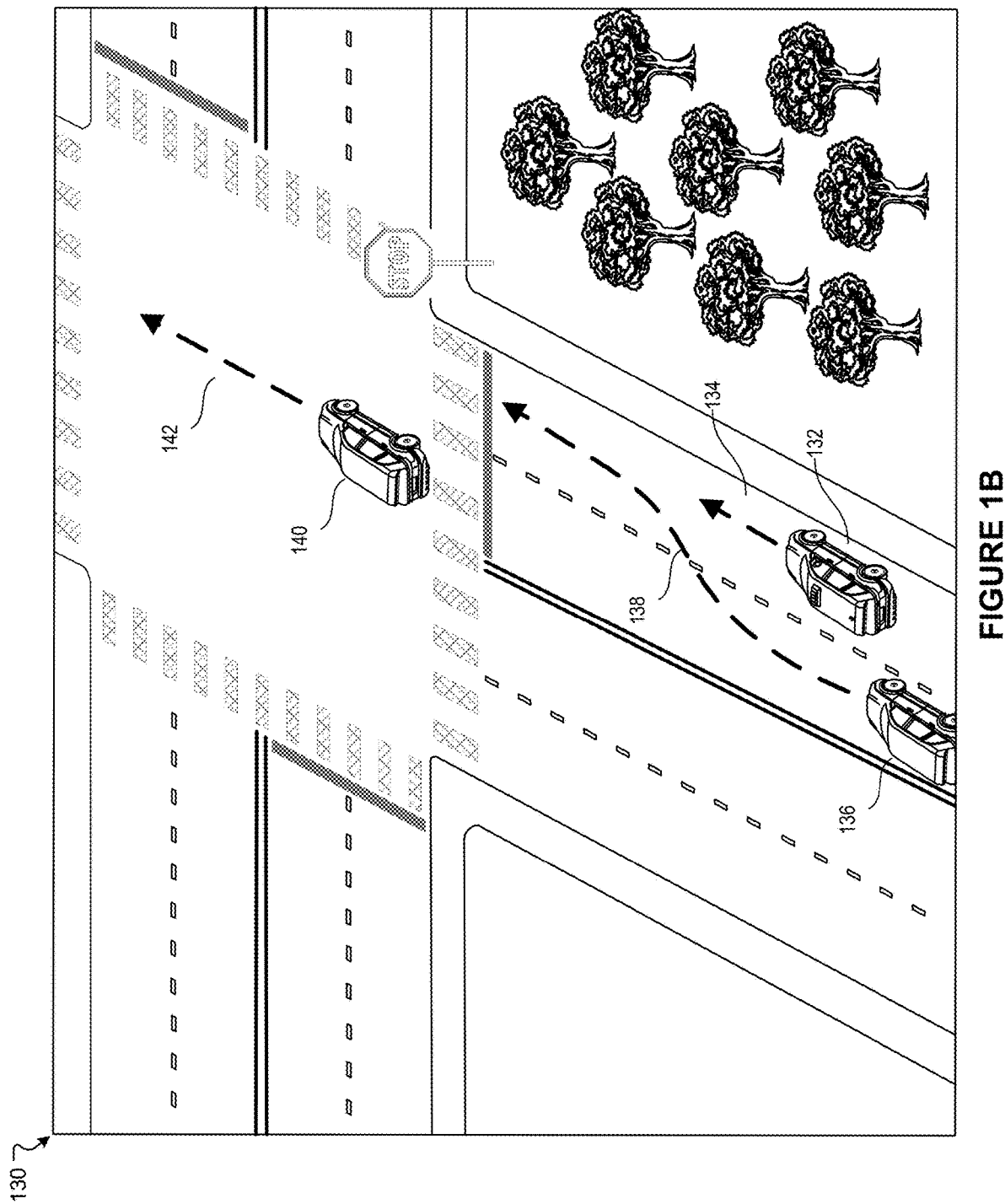

For instance, FIG. 1B illustrates a simulation involving an autonomous vehicle under conventional approaches of an example scenario 130 that is similar to the example scenario 100 of FIG. 1A. In the example scenario 130, an autonomous vehicle 132, a first vehicle 136 and a second vehicle 140 are travelling on a road. The autonomous vehicle 132 travels a planned path 134. The first vehicle 136 follows a first path 138, and the second vehicle 140 follows a second path 142. In the example scenario 130, the first path 138 involves a simulated cut in path based on the second path 108 followed by the second vehicle 106 in example scenario 100 of FIG. 1A. The second path 142 involves a simulated straight path based on the third path 112 followed by the third vehicle 110 in example scenario 100 of FIG. 1A and involves accelerating after stopping at a stop sign on the road. Under conventional approaches, simulation of behavior (e.g., paths) for objects, such as the first path 138 and the second path 142, are based on conventionally specified paths that are primitive in design. Because the first path 138 is such a conventionally specified path, simulation of the first vehicle 136 involves the first vehicle 136 unrealistically travelling the first path 138 without reacting to the autonomous vehicle 132, the second vehicle 140, and other objects that may be included in the simulation. Likewise, because the second path 142 is a conventionally specified path, simulation of the second vehicle 140 involves the second vehicle 140 travelling the second path 142 without reacting to the autonomous vehicle 132, the first vehicle 136, and other objects that may be included in the simulation. In contrast to the conventionally specified first path 138 and the conventionally specified second path 142, the paths of the first vehicle 136 and the second vehicle 140 in a more realistic real-word setting would react to each other and other objects.

Figure 1C:
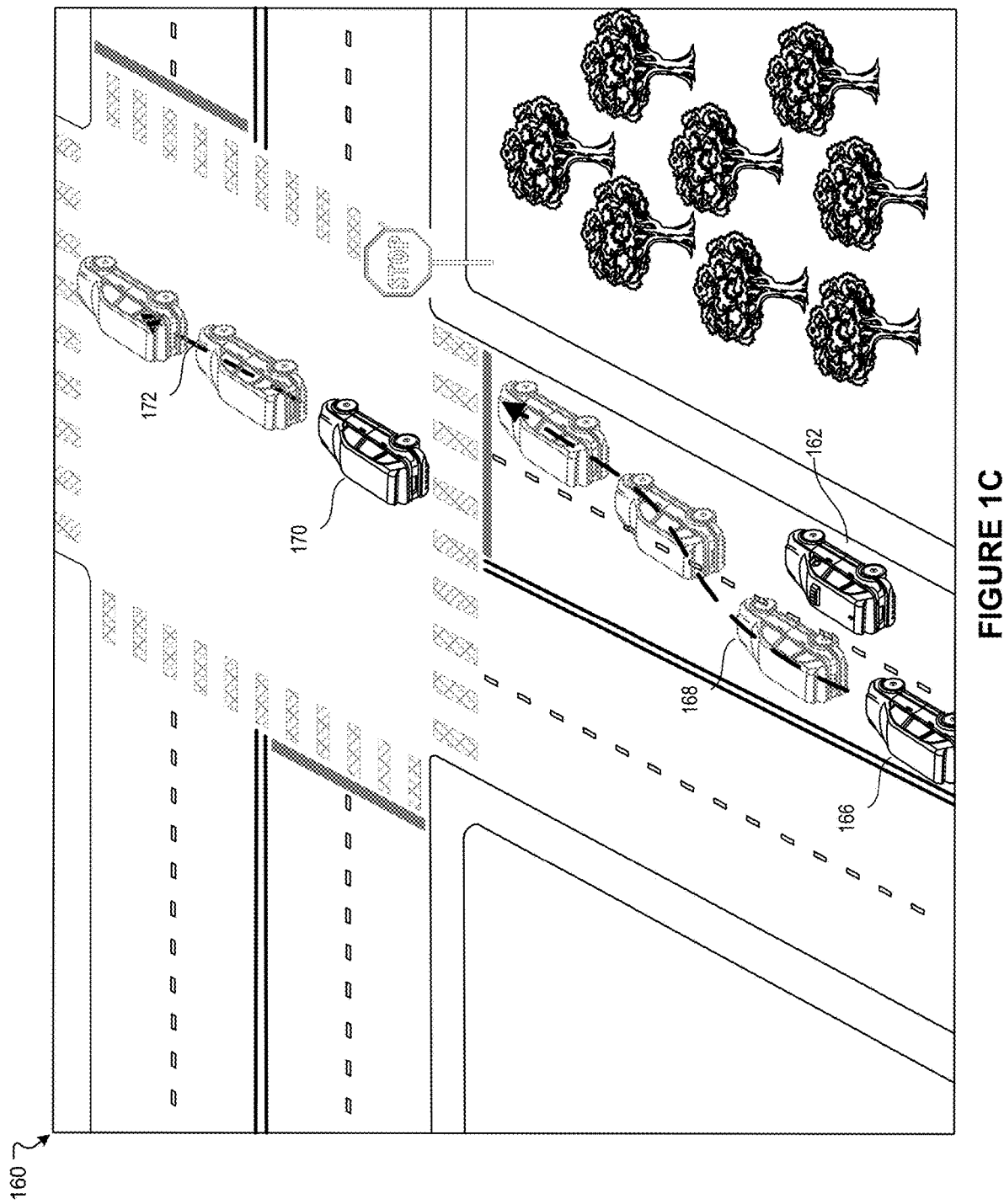

In some cases, the simulation can depict the first vehicle 136 travelling the first path 138 and the second vehicle 140 travelling the second path 142 through frames of data, such as frames of image data. FIG. 1C illustrates a simulation of an example scenario 160 that provides a first vehicle 166 travelling a first path 168 and a second vehicle 170 travelling a second path 172 as frames of data. The frames of data may be provided in a simulation to an autonomous vehicle 162. In the example scenario 160, movements of the first vehicle 166 and the second vehicle 170 are incrementally reflected through frames of data. The frames of data are provided in a sequence, and simulate the first vehicle 166 travelling the first path 168 and simulate the second vehicle 170 travelling the second path 172. As in the example scenario 130 of FIG. 1B, the first path 168 and the second path 172 are conventionally specified paths. Thus, simulation of the first vehicle 166 and simulation of the second vehicle 170 involve unrealistically travelling the specified paths without reacting to each other and without reacting to other objects that may be included in the simulation. As illustrated in FIGS. 1B-1C, simulation of a scenario under conventional approaches face challenges in that objects in the simulation do not react to other objects in the simulation. Because the objects in the simulation do not react to other objects in the simulation, the simulation does not provide a realistic representation of a real-world setting. Because the simulation does not provide a realistic representation of a real-world setting, the simulation does not provide a useful scenario for testing AV systems.

Figure 1D:
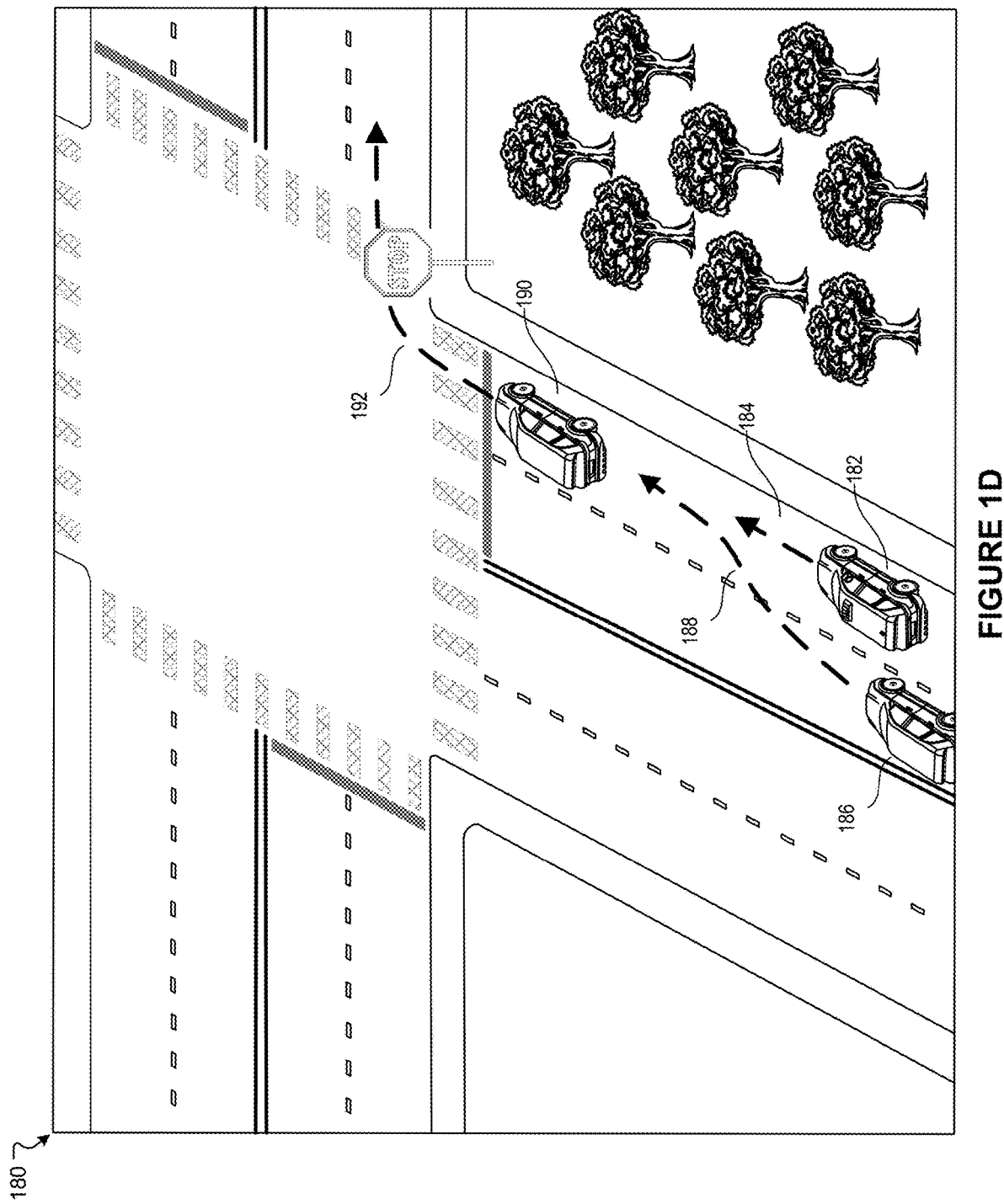

FIG. 1D illustrates a simulation of an example scenario 180 that involves a simulation of an autonomous vehicle 182 travelling a planned path 184, a first vehicle 186 travelling a first path 188, and a second vehicle 190 travelling a second path 192. In the example scenario 180, the first path 188 may involve a simulated cut in path that involves the first vehicle 186 cutting in between the autonomous vehicle 182, which is planning to travel straight on the planned path 184, and the second vehicle 190, which has stopped at a stop sign and is making a right turn on the second path 192. In order for the first vehicle 186 to travel the first path 188 realistically, the first vehicle 186 must react to the autonomous vehicle 182 and the second vehicle 190. However, under conventional approaches, during the simulation, the path planning of the first vehicle 186 does not react, for example, to the second vehicle 190 slowly preparing to make the right turn on the second path 192 or, for example, the autonomous vehicle 182 slowing down in reaction to the simulated cut in path. Indeed, under conventional approaches, the first vehicle 186 would operate merely according to a coded set of planned behaviors instructed by developers. However, using the coded set of behaviors alone is insufficient to impart computer simulation models with knowledge for all the different ways in which agents realistically respond to the environment as these coded set of behaviors do not take into account how the agents perceive their environment and behave accordingly based on their perception of their environment. Accordingly, under conventional approaches, the simulation of the example scenario 180 would not provide a realistic representation of a real-world setting where the driving behavior of one or more agents in the environment (e.g., the first vehicle 186) is dynamically affected by the behavior of other agents (e.g., the second vehicle 190) in the environment. Thus, conventional approaches are not effective in addressing these challenges.

An improved approach in accordance with the present technology provides for improved computer simulation of realistic agent behavior in various virtual environments, such as scenarios. In various embodiments, behavior of an agent (e.g., a simulated dynamic object, a simulated vehicle, etc.) in an environment involving an autonomous vehicle (or ego), such as an autonomous or semi-autonomous vehicle, is generated based on their "implied perception" of the environment. The implied perception can include contextual information of the environment that the agent utilizes to generate a trajectory in the environment. For example, a trajectory can be a list of points, or a series of positions, with associated velocity information. The velocity information can include a speed associated with a point or a time associated with a point, which can imply the speed. The velocity information also can include a direction associated with a point. Based on contextual information associated with the environment that is captured using the implied perception system for the agent, one or more constraints are determined. In some examples, the implied perception system may be a system that takes into account contextual information of the environment from a data store that can be used to generate trajectories in the environment using a path planner of the agent. Contextual information can include, for example, static objects (e.g., traffic signs), semi-static objects (e.g., construction areas), and other dynamic objects (e.g., pedestrians). Contextual information can also include, for example, traffic information (e.g., traffic laws) and environmental information (e.g., day, time, weather). Contextual information can also include an autonomous vehicle (e.g., ego) and its behavior. The one or more constraints can be associated with boundaries, obstacles, or limitations with which the agent should conform, as discussed in more detail herein. As a result, potential trajectories and changes in behavior of agents are more granular than conventional approaches due to taking into consideration contextual information and the degree of different contextual information that is considered. Based on the one or more constraints, candidate trajectories can be generated. A particular trajectory can be selected from these candidate trajectories as the trajectory on which the behavior of the agent is based. The trajectory can be selected, for example, based on the one or more constraints and how well the trajectory conforms to the one or more constraints. Further, an autonomous vehicle can respond to the behavior of the agent, and as the autonomous vehicle is included in the contextual information on which the one or more constraints are based, the behavior of the agent can respond to the autonomous vehicle. For example, a computer simulation can provide an environment, such as a scenario, that includes a stop sign and a vehicle. The computer simulation determines a constraint based on the stop sign. In this example, the constraint is a stop line corresponding to where the vehicle should stop for the stop sign. The computer simulation generates candidate trajectories based on the stop line. A trajectory for the vehicle is selected from the candidate trajectories. In this example, the selected trajectory conforms best with the stop line by slowing down and stopping appropriately at the stop line. In the computer simulation, behavior of the vehicle is based on the selected trajectory. In some embodiments, a trajectory can be generated and selected based on machine learning methodologies. For example, a machine learning model can be trained based on training data that includes trajectories of vehicles encountered in real-world scenarios. Based on the training data, the machine learning model can be trained to generate candidate trajectories or select candidate trajectories that are similar to those trajectories of vehicles encountered in real-world scenarios. Behavior of an agent can be simulated based on the generated and selected candidate trajectories. Thus, the present technology provides for improved computerized simulation by providing realistic behavior of agents that more closely resembles behavior that would be encountered in a real-world setting. Additionally the behavior of the agent may be adapted to changes that are observed in the behavior of the ego. For example, if the behavior of the ego is altered due to changes in the code of the ego, then, using the techniques described herein, the behavior of the agent may adapt to these changes. As another example, if the behavior of the ego is altered due to changes in the code of the ego, then a particular scenario that is subject to the simulation can also adapt to that change so as to generate a more reliable test for testing the particular scenario. More details relating to the present technology are provided below.

Figure 2:
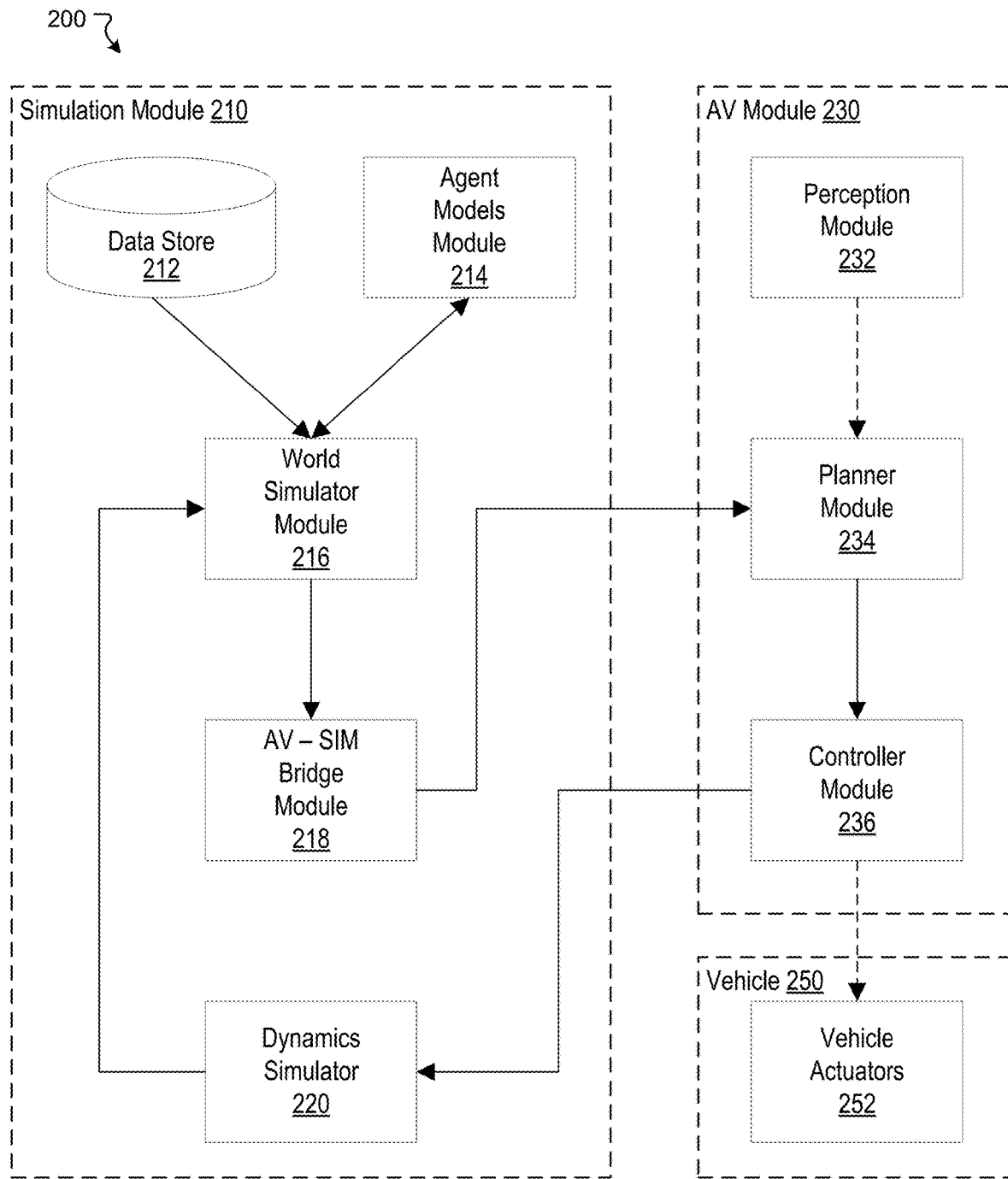
FIG. 2 illustrates an example system, according to an embodiment of the present technology.

FIG. 2 illustrates an example system 200 including an example simulation module 210, an AV module 230, and a vehicle 250, according to an embodiment of the present technology. The example simulation module 210 can generate a computer simulation for testing an autonomous vehicle system. As shown, the simulation module 210 can include an agent models module 214, a world simulator 216, an AV-SIM bridge 218, and a dynamics simulator 220. In various embodiments, the simulation module 210 has access to mission logs associated with a fleet of vehicles. The mission logs include sensor data collected by sensors of the fleet of vehicles from various sources and geographic locations. Sensor data may be collected by, for example, sensors mounted to the vehicles themselves and/or sensors on computing devices associated with users riding within the fleet of vehicles (e.g., user mobile devices). For example, the simulation module 210 can be configured to communicate and operate with at least one data store 212 that is accessible to the simulation module 210. The data store 220 can be configured to store and maintain various types of data, such as mission logs associated with the fleet of vehicles, sensor data captured by the fleet of vehicles, disengagement information, and the like.

Figure 6:
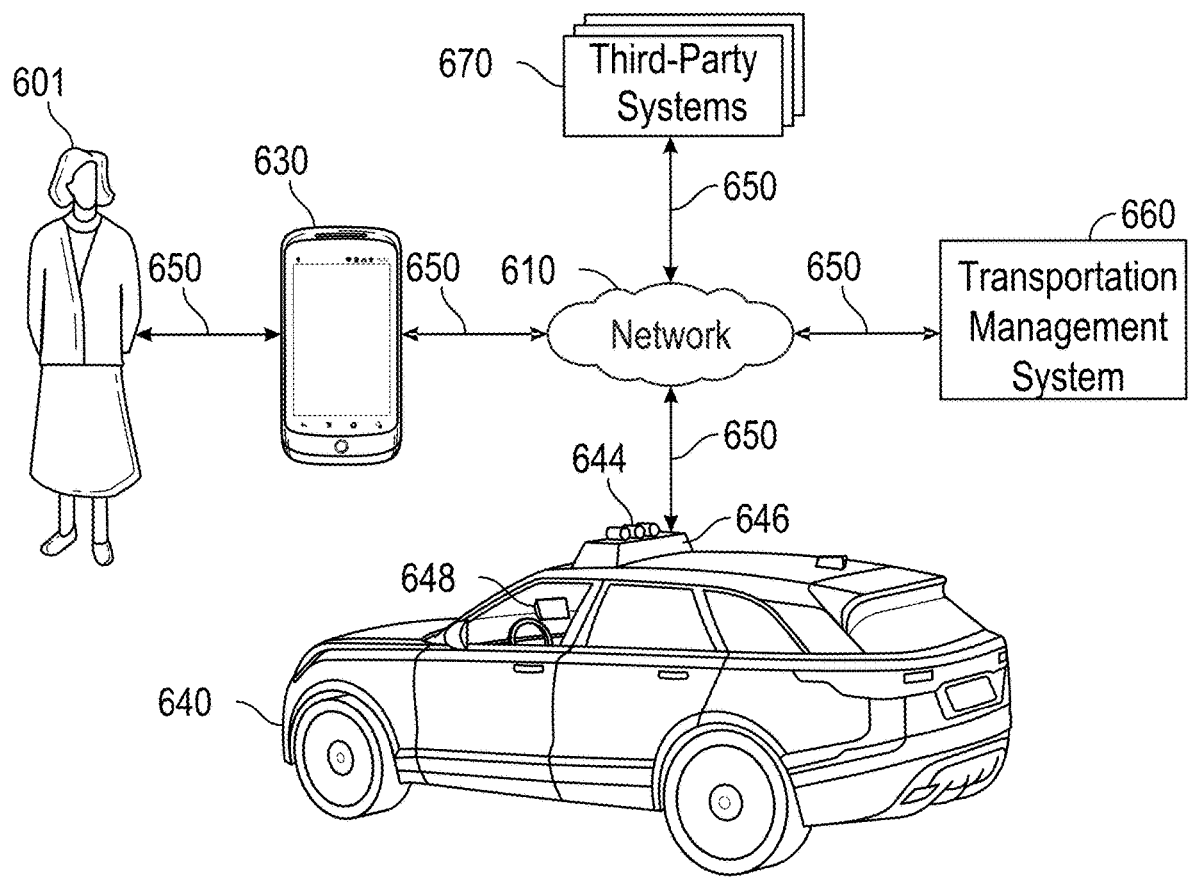
FIG. 6 illustrates an example block diagram of a transportation management environment, according to an embodiment of the present technology.

In some embodiments, some or all of the functionality performed by the simulation module 210 and its submodules may be performed by one or more backend computing systems, such as a transportation management system 660 of FIG. 6. In some embodiments, some or all of the functionality performed by the simulation module 210 and its sub-modules may be performed by one or more computing systems implemented in a vehicle, such as the vehicle 640 of FIG. 6. In some embodiments, some or all of the functionality performed by the simulation module 210 and its sub-modules may be performed by one or more computing systems associated with (e.g., carried by) one or more users riding in a vehicle and/or participating in a ridesharing service, such as the computing device 630 of FIG. 6. In some embodiments, some or all data stored in the data store 220 can be stored in a storage system (e.g., cloud storage), such as a storage system associated with the transportation management system 660 of FIG. 6. In some embodiments, some or all data stored in the data store 220 can be stored by a vehicle, such as a vehicle 640 of FIG. 6. The components (e.g., modules, elements, etc.) shown in this figure and all figures herein are exemplary only, and other implementations may include additional, fewer, integrated, or different components. Some components may not be shown so as not to obscure relevant details. While discussion provided herein may reference autonomous vehicles as examples, the present technology can apply to any other type of vehicle, such as semi-autonomous vehicles.

In various embodiments, information associated with an environment can be based on sensor data captured by vehicles. For example, the sensor data may include data captured by one or more sensors including optical cameras, LiDAR, radar, infrared cameras, and ultrasound equipment. The sensor data can be obtained from a data store or directly from sensors associated with a vehicle in real-time (or near real-time). In some cases, the obtained sensor data may have been captured by a fleet of vehicles that offer ridesharing services including autonomous and semi-autonomous vehicles. In some embodiments, related information can be obtained for sensor data such as a calendar date, day of week, and time of day during which the sensor data was captured. Such related information may be obtained from an internal clock of a sensor or a computing device, one or more external computing systems (e.g., Network Time Protocol (NAP) servers), or GPS data, to name some examples. More details describing the types of sensor data that may be obtained are provided below in connection with an array of sensors 644 of FIG. 6.

In FIG. 2, the simulation module 210 can be configured to generate a computer simulation. In general, a computer simulation can involve a combination of simulated features including static objects (e.g., buildings, traffic signs, etc.), semi-static objects (e.g., construction areas, temporary signs, temporary structures, etc.), dynamic objects, such as agents (e.g., pedestrians, vehicles, cyclists, animals, etc.), or a combination thereof. Further, the simulated features of the computer simulation can include various road types such as roads, freeways, and intersections. In some cases, simulated features of a computer simulation can be based on captured sensor data. For example, simulated features of a computer simulation can be based on image data captured by optical cameras, point clouds captured by a LiDAR system, or radar data captured by a radar system. The simulated features of a computer simulation can be based on mission data associated with a mission travelled by a vehicle. The mission data can include sensor data captured during the course of the mission and various environmental and contextual data such as geographical location, time of day, and weather.

In FIG. 2, the agent models module 214 can be configured to generate agent models on which behavior of an agent in a computer simulation can be based. The computer simulation can be used, for example, to test an autonomous vehicle system (e.g., ego). An agent model can generate behavior of an agent based on a trajectory. The trajectory can be selected from candidate trajectories generated by the agent model. In some cases, various agent models can be used to generate behavior of an agent. The various agent models can include, for example, naïve agent models, heuristic agent models, and machine learning agent models. The various agent models can be used individually, in combination, or sequentially to generate the behavior of the agent.

In some cases, behavior of an agent in a computer simulation can be based on a naïve agent model. A naïve agent model can generate behavior of an agent that does not react to other objects. The behavior of the agent can be based on a trajectory that follows a specified path at a specified speed. The specified path can include a list of points, or a series of positions, for the agent. For example, a naïve agent model can generate a behavior of an agent (e.g., simulated vehicle) that drives along a road. In this example, the behavior of the simulated vehicle can be based on a trajectory that follows a path of the road at a specified speed. While the behavior of the simulated vehicle based on the naïve agent model does not react to other objects, the behavior may be sufficient in cases where the simulated vehicle is unlikely to interact with an autonomous vehicle. These cases can include, for example, where the simulated vehicle and the autonomous vehicle are separated by more than a threshold distance, travelling in different directions, or travelling away from each other. For example, if a simulated vehicle is outside a threshold distance from an autonomous vehicle, it may be sufficient to base behavior of the simulated vehicle on a naïve agent model. If the simulated vehicle travels within the threshold distance, then the behavior of the simulated vehicle can be based on a different agent model.

In some cases, behavior of an agent in a computer simulation can be based on a heuristic agent model. A heuristic agent model can generate behavior of an agent that reacts to other objects in accordance with one or more constraints. The one or more constraints can be based on contextual information associated with an environment, such as an environment within a computer simulation. Determinations of the constraints can be performed by the world simulator module 216, as discussed in more detail herein. The heuristic agent model can generate candidate trajectories based on the one or more constraints. The candidate trajectories can follow a variety of paths at a variety of speeds. The heuristic agent model can select a trajectory from among the candidate trajectories and generate behavior of the agent based on the selected trajectory. The heuristic agent model can select the trajectory based on which candidate trajectory better conforms with the one or more constraints. In some cases, the heuristic agent model can determine which candidate trajectory better conforms with the one or more constraints by scoring the candidate trajectories. A candidate trajectory can be scored based on whether the candidate trajectory violates the one or more constraints or satisfies the one or more constraints. A candidate trajectory that violates fewer constraints or satisfies more constraints can be scored higher than a candidate trajectory that violates more constraints or satisfies fewer constraints. In some cases, a candidate trajectory can be scored based on a cost associated with violating the one or more constraints. In these cases, a candidate trajectory that violates more constraints is associated with a higher cost and receives a lower score than a candidate trajectory that violates fewer constraints and is associated with a lower cost. The heuristic agent model can select a candidate trajectory that has a higher (or highest) score or is associated with a lower (or lowest) cost than other candidate trajectories. Behavior of an agent can be based on the selected trajectory. For example, a heuristic agent model can generate a behavior of a simulated vehicle that drives straight along a road, slows, and stops at a stop sign. In this example, constraints can be based on a speed limit, lanes on the road, and the stop sign. The heuristic agent model can generate candidate trajectories and score the candidate trajectories. A candidate trajectory that violates, for example, the speed limit by exceeding the speed limit can be scored lower than a candidate trajectory that does not violate the speed limit. A candidate trajectory that violates, for example, the lanes on the road by crossing them can be scored lower than a candidate trajectory that does not violate the lanes. The heuristic agent model can select a candidate trajectory with a higher score than the other candidate trajectories. In this example, the selected trajectory can be a candidate trajectory that does not violate the speed limit, does not violate the lanes on the road, and stops appropriately at the stop sign. The heuristic agent model can generate behavior of the simulated vehicle based on the selected trajectory.

In some cases, behavior of an agent in a computer simulation can be based on a machine learning agent model. A machine learning agent model can generate behavior of an agent based on machine learning methodologies. The machine learning agent model can train one or more machine learning models and apply the trained machine learning models to generate candidate trajectories or select a trajectory from the candidate trajectories. The machine learning agent model can train the one or more machine learning models based on training data that includes data associated with how objects behave in various scenarios. The various scenarios can include, for example, real-world scenarios encountered by a driver or an autonomous vehicle system. The training data can include sensor data associated with the various scenarios. For example, the training data can be associated with behavior of vehicles at an intersection or behavior of vehicles on a freeway. The training data can be associated with various behaviors. For example, the training data can be associated with behavior of vehicles making a right turn or behavior of vehicles performing a lane change. The machine learning agent model can apply the trained machine learning models to contextual information, as discussed in more detail herein, that is associated with an input scenario. Based on the contextual information, the machine learning agent model can generate candidate trajectories or select a trajectory from the candidate trajectories using the trained machine learning models. Based on the candidate trajectories or the selected trajectory, the machine learning agent model can generate behavior of an agent.

The machine learning agent model can use different machine learning models for different scenarios or different behaviors. In some cases, a machine learning model can be trained for a particular scenario and, in some cases, a machine learning model can be trained for a particular behavior. For example, the machine learning agent model can train a machine learning model with training data associated with normal driving behavior of a vehicle in a particular scenario, such as a two-lane road. The machine learning agent model can apply the machine learning model to an input scenario similar to the particular scenario. In this example, the input scenario can be another two-lane road, which can also contain a variety of contextual features, including static objects and dynamic objects. Based on the input scenario, the machine learning agent model can generate behavior of an agent corresponding to normal driving behavior in the input scenario. As another example, a machine learning agent model can train a machine learning model with training data associated with non-standard driving behavior, such as performing a cut in. The machine learning agent model can apply the machine learning model to an input scenario associated with a vehicle performing a cut in. Based on the input scenario, the machine learning agent model can generate behavior of an agent corresponding to performing a cut in.

Behavior of an agent can be based on a combination of agent models. For example, behavior of an agent can be based on a combination of a naïve agent model, a heuristic agent model, and a machine learning agent model. Different agent models can be associated with different environments, different events, or different situations. In a combination of agent models, the agent models can be weighted based on an environment, an event, or a situation. For example, a computer simulation can involve an environment where an event causes a first situation in the computer simulation to change to a second situation. Behavior of an agent in this computer simulation can be based on a combination of agent models associated with the environment, the event, the first situation, and the second situation. As the computer simulation changes from the first situation to the second situation, weights associated with the agent models can change accordingly. In this example, the agent model associated with the first situation can be weighted greater than the agent model associated with the second situation during the first situation in the computer simulation. The agent model associated with the first situation can be afforded less weight and the agent model associated with the second situation can be afforded greater weight as the computer simulation changes from the first situation to the second situation. Behavior of an agent can be based on a single agent model, multiple agent models, or various combinations of agent models. Many variations are possible.

Figure 4A:
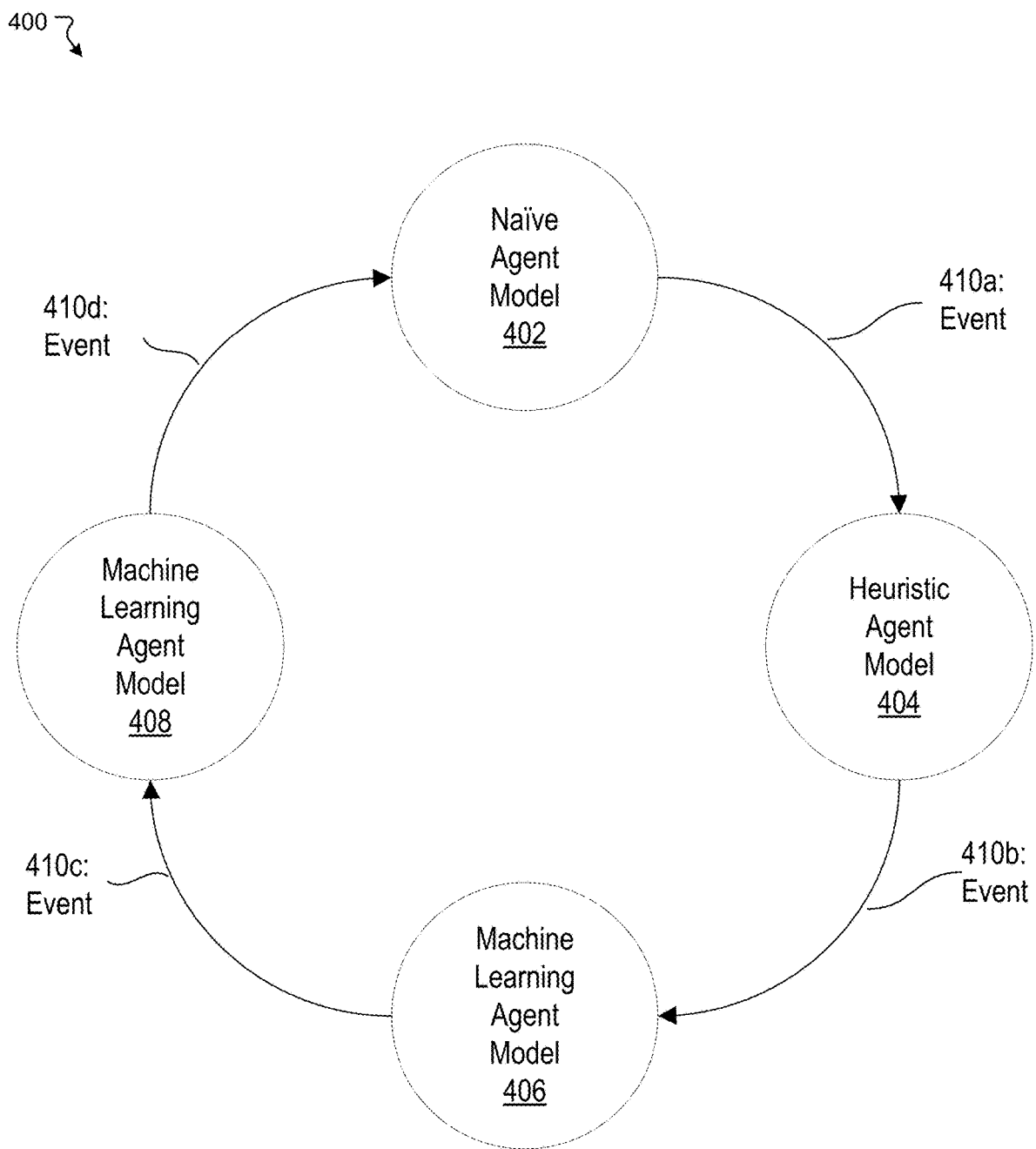
FIGS. 4A-4B illustrate example scenarios associated with AV simulation, according to an embodiment of the present technology.

FIG. 4A illustrates an example scenario 400 associated with using various agent models, according to an embodiment of the present technology. In the example scenario 400, a naïve agent model 402 is used to generate behavior of an agent. Following an event 410a, a heuristic agent model 404 is used to generate the behavior of the agent. Following an event 410b, a first machine learning agent model 406 is used to generate the behavior of the agent. Following an event 410c, a second machine learning agent model 408 is used to generate the behavior of the agent. Following an event 410d, the naïve agent model 402 is used to generate the behavior of the agent. As an example, the example scenario 400 can be associated with a simulation of an agent overtaking an autonomous vehicle on a road travelled by the agent and the autonomous vehicle. In this example, the agent is travelling behind the autonomous vehicle outside a threshold distance. Because the agent is outside the threshold distance, the naïve agent model 402 is used to generate behavior of the agent. The behavior of the agent generated by the naïve agent model 402 can be to travel forward at a specified speed. The behavior of the agent can continue to be generated by the naïve agent model 402 until the event 410a. In this example, the event 410a can be when the agent is within the threshold distance. Following the event 410a, when the agent is within the threshold distance, the behavior of the agent can be generated by the heuristic agent model 404. The behavior of the agent generated by the heuristic agent model 404 can be to change lanes and travel to the side of the autonomous vehicle. The behavior of the agent can continue to be generated by the heuristic agent model 404 until the event 410b. In this example, the event 410b can be when the agent has passed the autonomous vehicle. Following the event 410b, when the agent has passed the autonomous vehicle, the behavior of the agent can be generated by the first machine learning model 406. The behavior of the agent generated by the first machine learning model 406 can be to change lanes in front of the autonomous vehicle. The behavior of the agent can continue to be generated by the first machine learning model 406 until the event 410c. In this example, the event 410c can be when the agent is in front of and in the same lane as the autonomous vehicle. Following the event 410c, when the agent is in front of and in the same lane as the autonomous vehicle, the behavior of the agent can be generated by the second machine learning model 408. The behavior of the agent generated by the second machine learning model 408 can be to drive normally in front of the autonomous vehicle. The behavior of the agent can continue to be generated by the second machine learning model 408 until the event 410d. In this example, the event 410d can be when the agent is outside the threshold distance. Following the event 410d, when the agent is outside the threshold distance, the behavior of the agent can be generated by the naïve agent model 402. The example scenario 400 illustrates how various agent models can be used to generate behavior of an agent. In other embodiments, different usage and sequences of the models can be used. For example, behavior of an agent can be generated by the naïve agent model 402, the heuristic agent model 404, the first machine learning model 406, or the second machine learning model 408 in a mutually exclusive manner. Behavior of the agent can be generated, for example, exclusively by the naïve agent model 402, exclusively by the heuristic agent model 404, exclusively by the first machine learning model 406, or exclusively by the second machine learning model 408. In some cases, behavior of the agent can be generated without following an event. In some cases, behavior of the agent can be generated using any sequence or combination of models as described herein. Many variations are possible.

In FIG. 2, the world simulator module 216 can be configured to generate a computer simulation of an environment. The environment can include contextual information describing features in the environment. The features can include static objects, semi-static objects, dynamic objects, agents, or a combination thereof. The features can also include various road types such as roads, freeways, and intersections. Based on the contextual information, one or more constraints associated with the environment can be determined. The one or more constraints can be associated with boundaries, obstacles, or limitations in the environment. The one or more constraints can disincentivize certain behaviors of an agent, such as behaviors that are dangerous or illegal. For example, a stop line can be determined from a stop sign. The stop line can be a constraint associated with where a vehicle should stop in order to comply with the stop sign. As another example, lane boundaries can be determined based on lanes on a road. The lane boundaries can be constraints associated with borders within which a vehicle should travel in in view of the lanes on the road. As another example, obstacles can be determined based on agents. The obstacles can be constraints associated with what a vehicle should avoid in order to prevent a collision. In some cases, a computer simulation can be used to test an autonomous vehicle system. In the computer simulation, the autonomous vehicle system can be considered a dynamic object, or an obstacle. As such, constraints can be determined based on a presence of the autonomous vehicle system in the computer simulation. Agent models can generate behavior of agents in the computer simulation based on the constraints and, accordingly, respond to the presence of the autonomous vehicle system. For example, a computer simulation can be used to test autonomous vehicle behavior of an autonomous vehicle in a situation involving an agent performing a cut in maneuver. Behavior of the agent can be generated to perform the cut in maneuver within a threshold distance in front of the autonomous vehicle. In this example, the autonomous vehicle can be updated and travel at a different speed in the computer simulation. The behavior of the agent can respond accordingly to the different speed of the autonomous vehicle and perform the cut in maneuver based on the different speed of the autonomous vehicle. This example illustrates advantages over conventional approaches as a conventional simulation would not respond to the different speed of the autonomous vehicle. Thus, the conventional computer simulation would no longer involve a cut in maneuver (e.g., the maneuver is too far ahead of the slower autonomous vehicle, the maneuver is behind the faster autonomous vehicle, etc.) and the conventional computer simulation would need to be rebuilt to account for the different speed of the autonomous vehicle. As another example, a computer simulation can be used to test autonomous vehicle behavior of an autonomous vehicle at an intersection. The intersection can include various features, such as lanes and traffic lights. The intersection can also include agents, such as vehicles. Behaviors of the agents can be based on agent models. Constraints can be determined based on the various features at the intersection and the agents. Constraints can also be determined based on the autonomous vehicle at the intersection. The behavior of the agents can be based on the constraints associated with the various features, the constraints associated with the other agents at the intersection, and the constraints associated with the autonomous vehicle at the intersection. Accordingly, the behavior of the agents in a computer simulation can be responsive to the other agents and the autonomous vehicle.

In FIG. 2, the AV-SIM bridge module 218 can be configured to generate an output based on an environment. The output can correspond to sensor data that an autonomous vehicle system would perceive if the autonomous vehicle was in the environment. The output can be generated based on historical sensor data associated with features in the environment. The historical sensor data can include captured sensor data corresponding to the features. For example, an output associated with a stop sign can be based on historical sensor data associated with stop signs. The historical sensor data can include sensor data that was captured in relation to stop signs encountered at various sources and locations. For example, a computer simulation can be used to test autonomous vehicle behavior of an autonomous vehicle system, such as AV module 230, in an environment, such as an intersection. The intersection can include various features, such as lanes, traffic lights, and agents. In this example, the AV-SIM bridge module 218 can generate an output that would be perceived by the autonomous vehicle as sensor data associated with the various features. The AV-SIM bridge module 218 can provide the output to the autonomous vehicle. Accordingly, the autonomous vehicle can perceive the intersection based on the generated output.

In FIG. 2, the dynamics simulator 220 can be configured to generate movement information associated with an autonomous vehicle based on control instructions outputted by an autonomous vehicle system of the autonomous vehicle. The control instructions can include instructions used by the autonomous vehicle system to drive the autonomous vehicle. The movement information associated with the autonomous vehicle allows the world simulator module 216 to update an environment with an updated location of the autonomous vehicle.

In FIG. 2, the AV module 230 can be configured to control an autonomous vehicle, such as the vehicle 250. In some cases, the AV module 230 can be tested based on a computer simulation generated by the simulation module 210. The AV module 230 includes a perception module 232, a planner module 234, and a controller module 236. In the case of controlling an autonomous vehicle, the perception module 232 can be configured to capture sensor data from sensor mounted on the autonomous vehicle. For example, the sensor data may include data captured by one or more sensors including optical cameras, LiDAR, radar, infrared cameras, and ultrasound equipment, to name some examples. The planner module 234 can be configured to determine a trajectory to control the autonomous vehicle based on the captured sensor data. In general, determining the trajectory to control the autonomous vehicle involves recognizing features, such as static objects, semi-static objects, dynamic objects, and determining a path that safely navigates the autonomous vehicle while avoiding hazards. As shown in FIG. 2, the planner module 234 can use information provided by the AV-SIM bridge module 218 to determine trajectories for the vehicle 250. The vehicle 250 includes vehicle actuators 252. The controller module 236 can be configured to determine instructions for controlling a vehicle based on a trajectory. The controller module 236 can provide instructions to the dynamics simulator 220 to allow for simulating behavior of the autonomous vehicle in a computer simulation. The AV module 230 can be configured to control the vehicle 250 by providing instructions to the vehicle actuators 252 of the vehicle 250. The vehicle actuators 252 can be configured to control the vehicle 250. For example, the vehicle actuators 252 can steer the vehicle 250 and control speed, acceleration, and deceleration of the vehicle 250.

Figure 3:
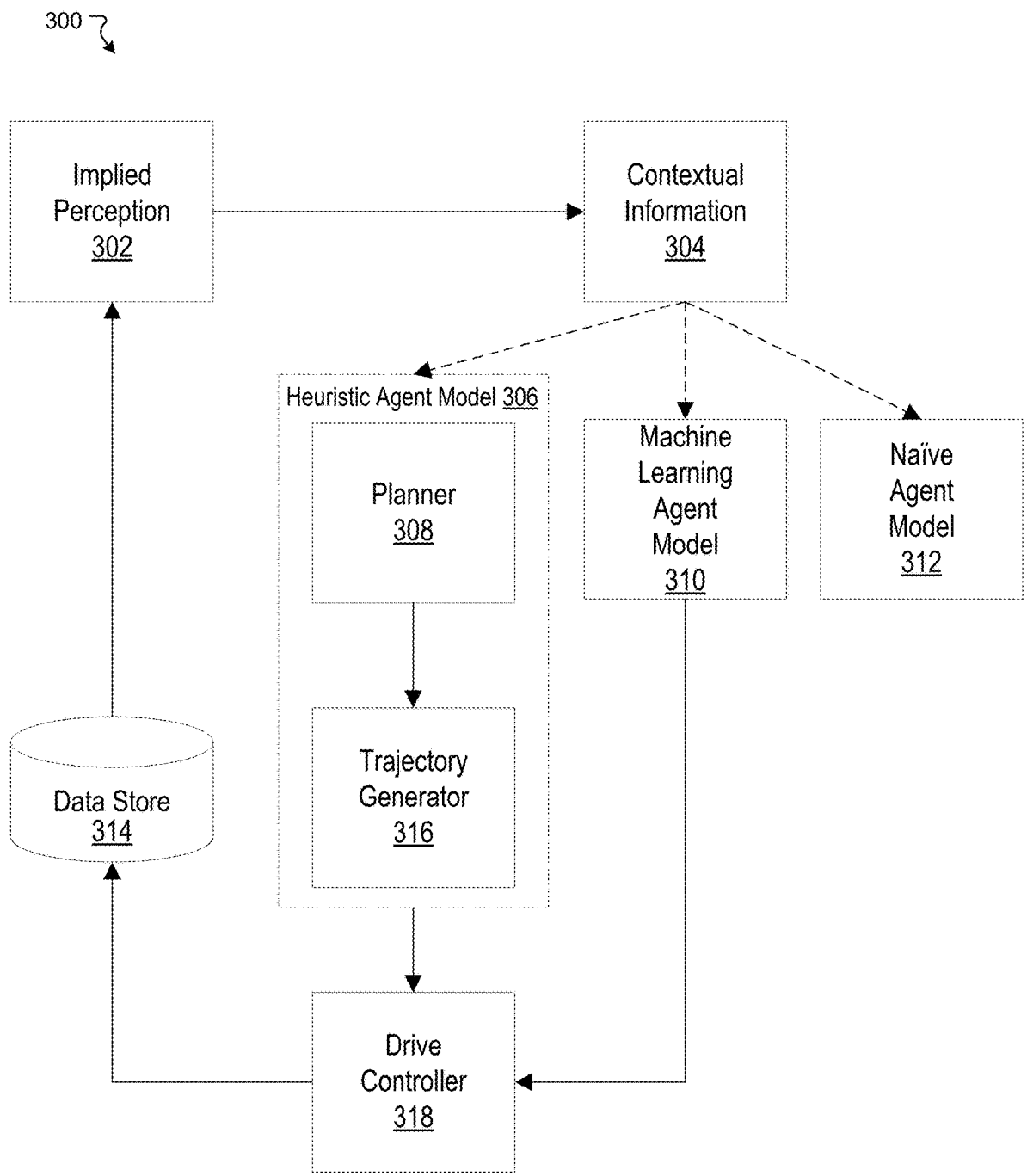
FIG. 3 illustrates an example system, according to an embodiment of the present technology.

FIG. 3 illustrates an example agent controller system 300 according to an embodiment of the present technology. The example agent controller system 300 can generate behavior of an agent in a computer simulation. In various embodiments, the example agent controller system 300 can be implemented in or with the agent models module 214 and the world simulator module 216 of the example system 200 of FIG. 2. As shown, the example agent controller system 300 can include implied perception 302, contextual information 304, a heuristic agent model 306, a planner 308, a machine learning agent model 310, a naïve agent model 312, a trajectory generator 316, and a drive controller 318. In various embodiments, the example agent controller system 300 has access to semantic maps and other data associated with AV simulation. For example, the example agent controller system 300 can be configured to communicate and operate with at least one data store 314. The data store 314 can be configured to store and maintain various types of data, such as semantic maps, agent models, and other data associated with AV simulation. In some embodiments, some or all data stored in the data store 314 can be stored by the vehicle 640 of FIG. 6. In some embodiments, some or all of the functionality performed by the example agent controller system 300 and its components may be performed by one or more computing systems implemented in a vehicle, such as the vehicle 640 of FIG. 6. In some embodiments, some or all of the functionality performed by the example agent controller system 300 and its components may be performed by one or more computing systems associated with (e.g., carried by) one or more users riding in a vehicle and/or participating in a ridesharing service, such as the computing device 630 of FIG. 6. In some embodiments, some or all of the functionality performed by the example agent controller system 300 and its components may be performed by one or more backend computing systems, such as the transportation management system 660 of FIG. 6. The components (e.g., modules, elements, etc.) shown in this figure and all figures herein are exemplary only, and other implementations may include additional, fewer, integrated, or different components. Some components may not be shown so as not to obscure relevant details.

In FIG. 3, the agent controller system 300 can be configured to implement a state of an agent based on contextual information 304 associated with an environment of a computer simulation. The state of the agent can also be implemented based on an objective of an agent or an event. The objective of the agent can be to travel to a particular destination in the environment or to perform a particular maneuver. The event can be a condition that is satisfied during the computer simulation. The agent controller system 300 can select from various agent models to generate behavior for the agent based on the state of the agent at a given moment. The various agent models can include the heuristic agent model 306, the machine learning agent model 310, and the naïve agent model 312. For example, an agent can be in a first state at a start of a computer simulation. In the first state, an objective of the agent can be to drive straight to a particular location. While in the first state, behavior of the agent can be generated based on, for example, the naïve agent model 312 or the machine learning agent model 310 trained to drive straight. The agent can be in a second state when the agent has driven to the particular location. In the second state, the objective of the agent can be to perform a u-turn maneuver. While in the second state, behavior of the agent can be generated based on, for example, the heuristic agent model 306 or the machine learning agent model 310 trained to perform u-turns.

In FIG. 3, the heuristic agent model 306 can include the planner 308 and the trajectory generator 316. The planner 308 can be configured to determine a path and one or more constraints associated with the path based on the contextual information 304 associated with an environment of a computer simulation. In some cases, the one or more constraints can be determined based on environmental information or mapping information from, for example, the data store 314. The one or more constraints can be based on the implied perception 302. The implied perception 302 can generate the contextual information 304 associated with an environment based on environmental information or mapping information from, for example, the data store 314. The planner 308 can be configured to determine a path and one or more constraints associated with the path based on the contextual information 304. The one or more constraints can be associated with boundaries, obstacles, or limitations in the environment. The one or more constraints can incentivize certain behaviors of an agent, such as desired paths and desired velocities, which may be more representative of real-world behavior. The one or more constraints can also disincentivize certain behaviors of the agent, such as behaviors that are dangerous or illegal. For example, the one or more constraints can include stop constraints associated with traffic lights and stop signs on a road. The stop constraints can be based on where the agent should stop in order to comply with the traffic lights and the stop signs. As other examples, the one or more constraints can include boundary constraints associated with lanes on the road, curbs on the road, and a follow distance behind other vehicles on the road. The boundary constraints can be based on where the agent should travel in order to maintain safety. As still other examples, the one or more constraints can include speed constraints associated with speed limits or driving conditions of the road. The speed constraints can be based on a speed with which the agent should travel in order to avoid violating traffic laws and to maintain safety.

The one or more constraints can also incentivize certain behavior of the agent, such as behavior to test a response of an autonomous vehicle. For example, the one or more constraints can be associated with a desired path and a desired velocity. The desired path and the desired velocity can incentivize the agent to travel within a threshold distance of the desired path and within a threshold velocity of the desired velocity. As another example, the one or more constraints can be associated with a desired behavior, such as aggressive acceleration or sharp turns. For example, a computer simulation can seek to test a response of an autonomous vehicle to an agent making a sharp right turn at an intersection. In this example, boundary constraints can disincentivize the agent from travelling outside the intersection. A desired path constraint can incentivize the agent to make a right turn at the intersection. A behavior constraint can incentivize the agent to make the right turn a sharp right turn. In accordance with these constraints, a trajectory of the agent that fails to remain within the intersection violates the boundary constraints. A trajectory of the agent that fails to make a right turn at the intersection violates the desired path constraint. A trajectory that fails to make a sharp turn violates the behavior constraint. Thus, a trajectory that satisfies all these constraints would involve a sharp right turn at the intersection. The planner 304 can select an appropriate trajectory from possible trajectories based on satisfaction of applicable constraints and related incentives.

In FIG. 3, the trajectory generator 316 can be configured to generate candidate trajectories for an agent and select a trajectory from the candidate trajectories. In some cases, candidate trajectories for the agent can be generated based on a desired path. The candidate trajectories can be generated based on deviations in lateral movement and longitudinal movement along the desired path. Based on the deviations in lateral movement and longitudinal movement, the candidate trajectories vary in position and velocity in a space along the desired path. In some cases, thresholds associated with minimum acceleration, maximum acceleration, minimum jerk, maximum jerk, minimum speed, or maximum speed can be applied to filter the candidate trajectories. Filtering the candidate trajectories can remove, for example, unrealistic candidate trajectories. The candidate trajectories can be scored, and a trajectory can be selected from the candidate trajectories based on the scores of the candidate trajectories. The scores of the candidate trajectories can be based on whether the candidate trajectories violate any constraints. Candidate trajectories that violate fewer constraints can be associated with higher scores than candidate trajectories that violate more constraints. The selected trajectory can be based on a candidate trajectory with the highest score.

In some cases, candidate trajectories for an agent can be generated and selected based on the machine learning agent model 310. For example, a machine learning model can be trained based on training data that includes trajectories associated with various behaviors captured in various environments. The trained machine learning model can be applied to an environment and a desired behavior. Based on the environment and the desired behavior, the machine learning model can generate candidate trajectories. In some cases, the same or another trained machine learning model can be applied to candidate trajectories and a trajectory can be selected from the candidate trajectories based on the trained machine learning model. The selected trajectory can be used to generate a behavior for an agent.

In FIG. 3, the drive controller 318 can be configured to generate a behavior of an agent based on a trajectory. In some cases, the drive controller 318 can generate instructions for controlling an agent in a computer simulation based on a trajectory. The instructions for controlling the agent can include, for example, instructions for turning a steering wheel, instructions for engaging a brake, instructions for disengaging the brake, instructions for engaging a gas pedal, instructions for disengaging the gas pedal, and the like. In a computer simulation, the instructions for controlling the agent can be used to move the agent from a first position to a second position in accordance with the trajectory. In some cases, the drive controller 308 can determine a future position of an agent based on a trajectory. In a computer simulation, the determined future position of the agent can be used to move the agent from a previous position to the determined position. In some cases, the drive controller 318 can update environmental information or mapping information, for example, in the data store 314, based on a behavior of an agent.

Figure 4B:
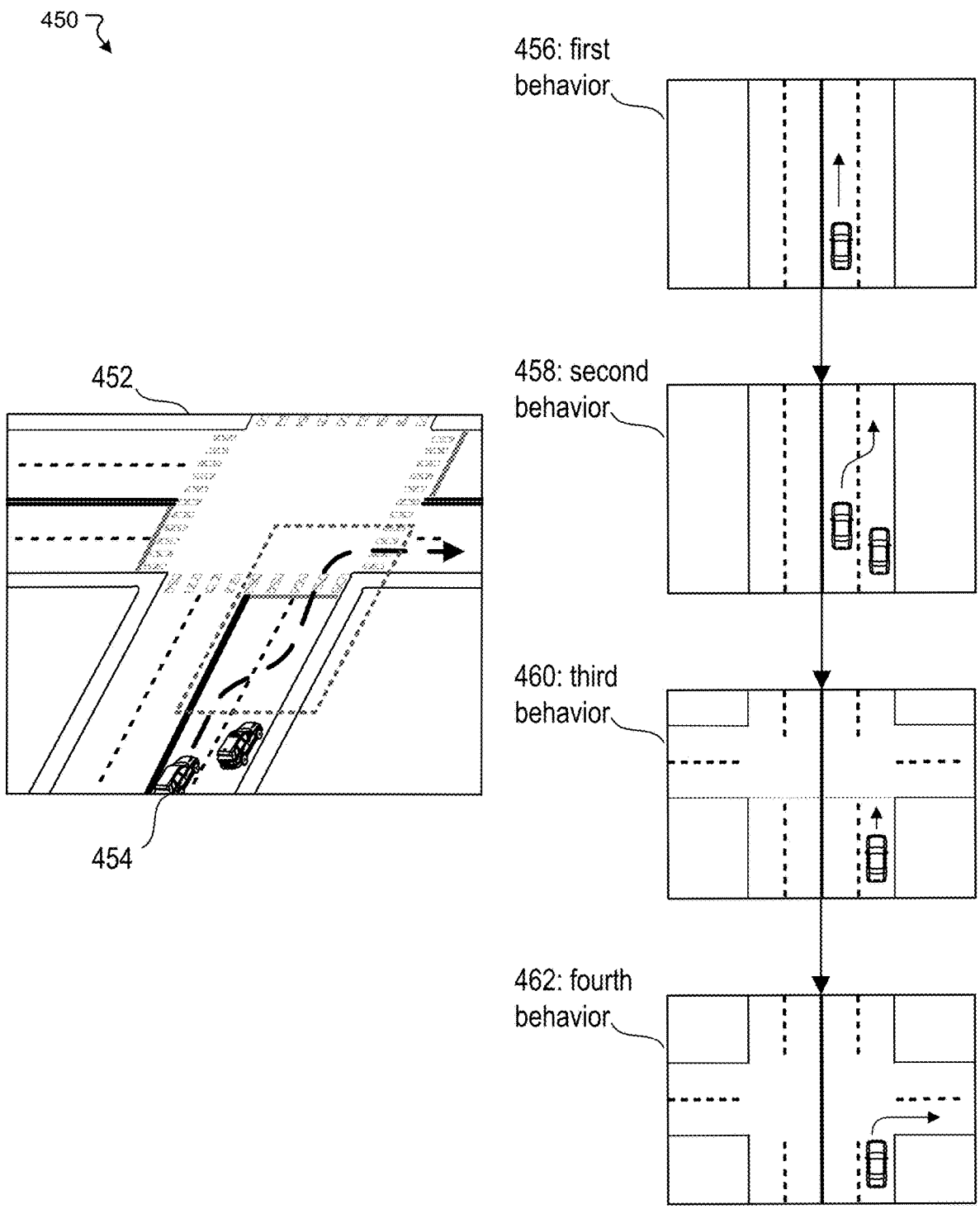

FIG. 4B illustrates an example scenario 450 associated with using various agent models, according to an embodiment of the present technology. The example scenario 450 relates to a selected desired path for an agent. The desired path may be selected to test behavior of an autonomous vehicle in a specific situation. In some instances, the desired path may be a path that normally would not be selected. For example, the desired path can be a path that violates constraints. In the example scenario 450, a computer simulation 452 involves an agent 454 performing a cut in maneuver in front of an autonomous vehicle, stopping at an intersection, and making a right turn at the intersection. The computer simulation 452 can include multiple behaviors generated for the agent 454. The computer simulation 452 can include a first behavior 456. The first behavior 456 can involve a normal driving behavior. Following the first behavior 456, the computer simulation 452 can include a second behavior 458. The second behavior 458 can involve behavior for performing a cut in maneuver. Following the second behavior 458, the computer simulation 452 can include a third behavior 460. The third behavior 460 can involve stopping at the intersection. Following the third behavior 460, the computer simulation 452 can include a fourth behavior 462. The fourth behavior 462 can involve making a right turn at the intersection. In some cases, the first behavior 456, the second behavior 458, the third behavior 460, and the fourth behavior 462 can be generated by one or more machine learning models that can generate trajectories for the agent 454. For example, a machine learning model can be provided with a desired path that involves overtaking the autonomous vehicle and making the right turn at the intersection. The machine learning model can also be provided with a desired behavior for making a cut in maneuver. Based on the desired path and the desired behavior, the machine learning model can generate a behavior that includes the first behavior 456, the second behavior 458, the third behavior 460, and the fourth behavior 462. As another example, the first behavior 456, the second behavior 458, the third behavior 460, and the fourth behavior 462 can be generated by multiple machine learning models. A first machine learning model can be provided with a desired behavior to drive normally from behind the autonomous vehicle to a threshold distance of the autonomous vehicle. A second machine learning model can be provided with a desired behavior to perform a cut in maneuver in front of the autonomous vehicle. A third machine learning model can be provided with a desired behavior to stop at the intersection. A fourth machine learning model can be provided with a desired behavior to make a right turn at the intersection. In this example, the first machine learning model, the second machine learning model, the third machine learning model, and the fourth machine learning model can generate the first behavior 456, the second behavior 458, the third behavior 460, and the fourth behavior 462, respectively. Many variations are possible.

Figure 5A:
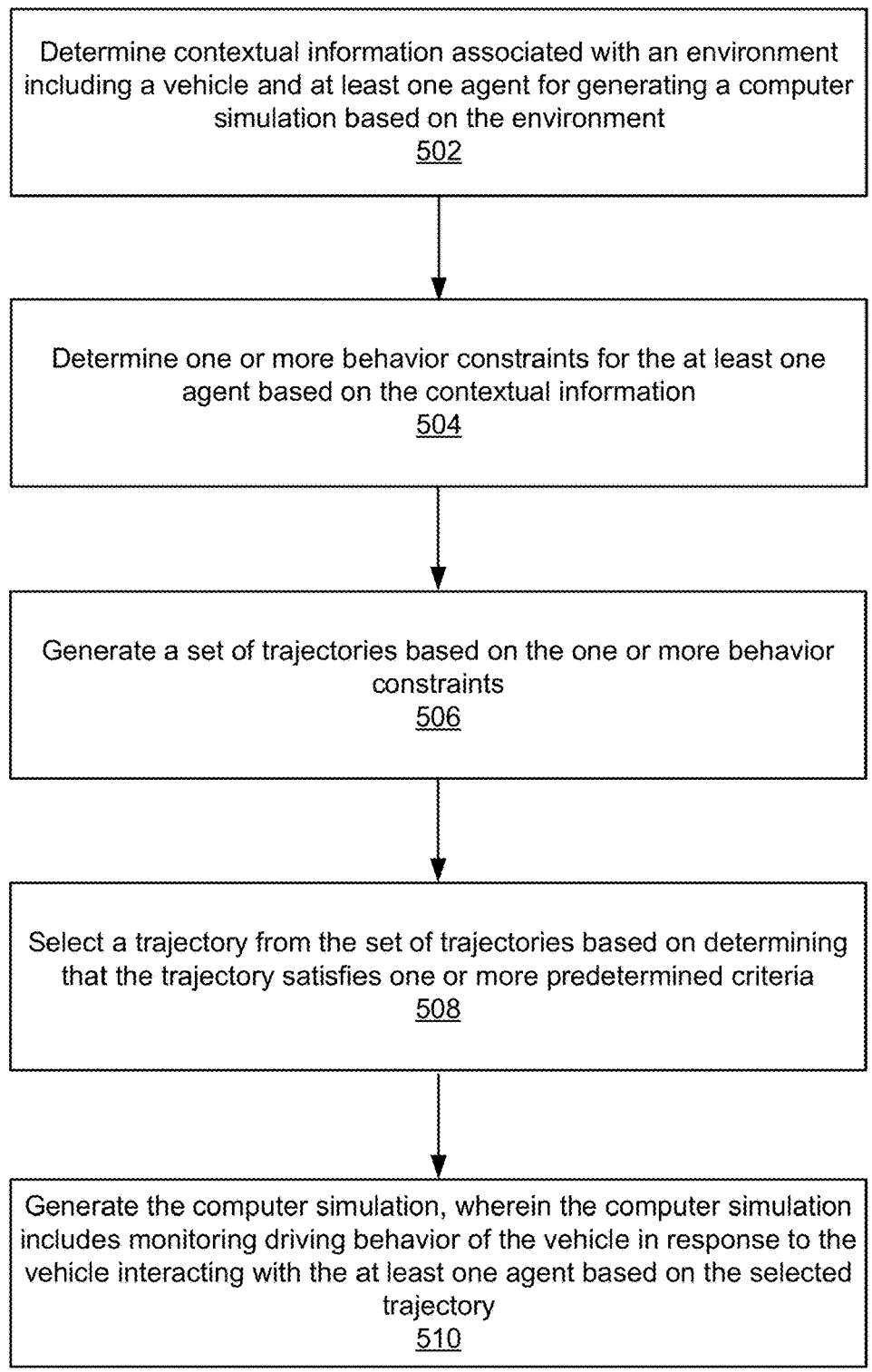
FIGS. 5A-5B illustrate example methods, according to an embodiment of the present technology.

FIG. 5A illustrates an example method 500, according to an embodiment of the present technology. The example method 500 can be applied to various usages. For example, the example method 500 can be applied to testing or updating an autonomous vehicle system or be used to determine a miles per estimated contact metric associated with the autonomous vehicle system. At block 502, the example method 500 determines contextual information associated with an environment based on an event. At block 504, the example method 500 determines one or more constraints based on the contextual information. At block 506, the example method 500 generates a set of trajectories based on the one or more constraints. At block 508, the example method 500 selects a trajectory from the set of trajectories based on the one or more constraints. At block 510, the example method 500 generates a computer simulation of an agent based on the selected trajectory. Many variations to the example method are possible. It should be appreciated that there can be additional, fewer, or alternative steps performed in similar or alternative orders, or in parallel, within the scope of the various embodiments discussed herein unless otherwise stated.

Figure 5B:
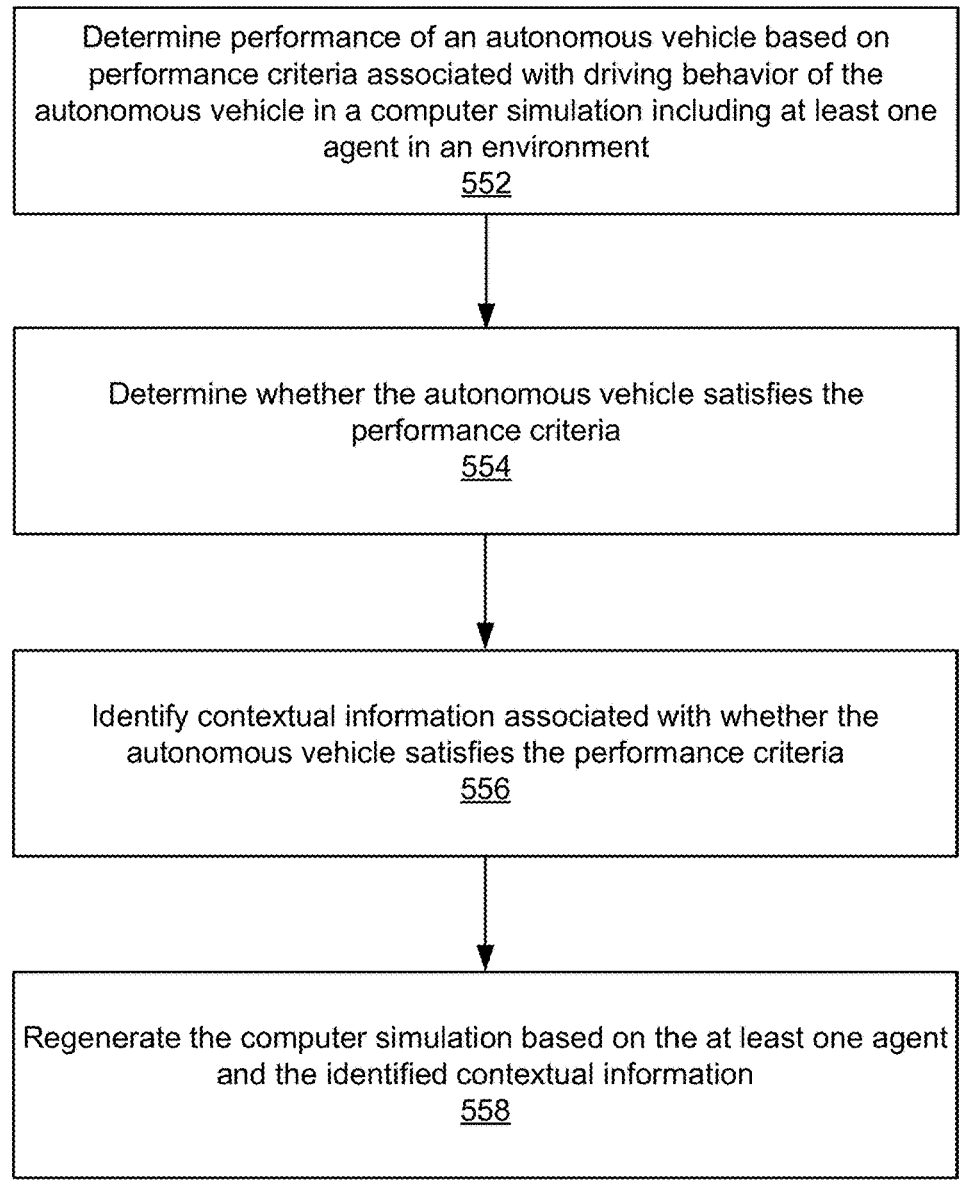

FIG. 5B illustrates an example method 550, according to an embodiment of the present technology. The example method 550 can be applied to utilizing feedback from simulating an autonomous vehicle system in a computer simulation. The feedback from the computer simulation can be used to reinitialize the computer simulation to target areas where the autonomous vehicle system failed to satisfy performance criteria such as miles per estimated contact (MPEC) or miles per intervention (MPI). The feedback from the computer simulation may also be used to triage (e.g., determine a cause by which the autonomous vehicle system failed to satisfy performance criteria). At block 552, the example method 550 determines performance of an autonomous vehicle based on performance criteria associated with driving behavior of the autonomous vehicle in a computer simulation including at least one agent in an environment. At block 554, the example method 550 determines whether the autonomous vehicle satisfies the performance criteria. At block 556, the example method 550 identifies contextual information associated with whether the autonomous vehicle satisfies the performance criteria. At block 558, the example method 550 regenerates the computer simulation based on the at least one agent in the environment and the identified contextual information. For example, the computer simulation may be considered a plug and play model. Many variations to the example method are possible. It should be appreciated that there can be additional, fewer, or alternative steps performed in similar or alternative orders, or in parallel, within the scope of the various embodiments discussed herein unless otherwise stated.

FIG. 6 illustrates an example block diagram of a transportation management environment for matching ride requestors with vehicles. In particular embodiments, the environment may include various computing entities, such as a user computing device 630 of a user 601 (e.g., a ride provider or requestor), a transportation management system 660, a vehicle 640, and one or more third-party systems 670. The vehicle 640 can be autonomous, semi-autonomous, or manually drivable. The computing entities may be communicatively connected over any suitable network 610. As an example and not by way of limitation, one or more portions of network 610 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 6 illustrates a single user device 630, a single transportation management system 660, a single vehicle 640, a plurality of third-party systems 670, and a single network 610, this disclosure contemplates any suitable number of each of these entities. As an example and not by way of limitation, the network environment may include multiple users 601, user devices 630, transportation management systems 660, vehicles 640, third-party systems 670, and networks 610. In some embodiments, some or all modules shown in FIG. 2 and FIG. 3 may be implemented by one or more computing systems of the transportation management system 660. In some embodiments, some or all modules shown in FIG. 2 and FIG. 3 may be implemented by one or more computing systems in the vehicle 640. In some embodiments, some or all modules shown in FIG. 2 and FIG. 3 may be implemented by the user device 630.

The user device 630, transportation management system 660, vehicle 640, and third-party system 670 may be communicatively connected or co-located with each other in whole or in part. These computing entities may communicate via different transmission technologies and network types. For example, the user device 630 and the vehicle 640 may communicate with each other via a cable or short-range wireless communication (e.g., Bluetooth, NFC, WI-FI, etc.), and together they may be connected to the Internet via a cellular network that is accessible to either one of the devices (e.g., the user device 630 may be a smartphone with LTE connection). The transportation management system 660 and third-party system 670, on the other hand, may be connected to the Internet via their respective LAN/WLAN networks and Internet Service Providers (ISP). FIG. 6 illustrates transmission links 650 that connect user device 630, vehicle 640, transportation management system 660, and third-party system 670 to communication network 610. This disclosure contemplates any suitable transmission links 650, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 650 may connect to one or more networks 610, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 650. For example, the user device 630 may communicate with the transportation management system via a cellular network and the Internet, but communicate with the vehicle 640 via Bluetooth or a physical wire connection.

In particular embodiments, the transportation management system 660 may fulfill ride requests for one or more users 601 by dispatching suitable vehicles. The transportation management system 660 may receive any number of ride requests from any number of ride requestors 601. In particular embodiments, a ride request from a ride requestor 601 may include an identifier that identifies the ride requestor in the system 660. The transportation management system 660 may use the identifier to access and store the ride requestor's 601 information, in accordance with the requestor's 601 privacy settings. The ride requestor's 601 information may be stored in one or more data stores (e.g., a relational database system) associated with and accessible to the transportation management system 660. In particular embodiments, ride requestor information may include profile information about a particular ride requestor 601. In particular embodiments, the ride requestor 601 may be associated with one or more categories or types, through which the ride requestor 601 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 660 may classify a user 601 based on known information about the user 601 (e.g., using machine-learning classifiers), and use the classification to retrieve relevant aggregate information associated with that class. For example, the system 660 may classify a user 601 as a young adult and retrieve relevant aggregate information associated with young adults, such as the type of music generally preferred by young adults.

Transportation management system 660 may also store and access ride information. Ride information may include locations related to the ride, traffic data, route options, optimal pick-up or drop-off locations for the ride, or any other suitable information associated with a ride. As an example and not by way of limitation, when the transportation management system 660 receives a request to travel from San Francisco International Airport (SFO) to Palo Alto, Calif., the system 660 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 660. For example, historical data may include aggregate information generated based on past ride information, which may include any ride information described herein and telemetry data collected by sensors in vehicles and user devices. Historical data may be associated with a particular user (e.g., that particular user's preferences, common routes, etc.), a category/class of users (e.g., based on demographics), and all users of the system 660. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 660 in particular embodiments may predict and provide ride suggestions in response to a ride request. In particular embodiments, the system 660 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and semi-supervised learning based on a mixture of labeled and unlabeled training data.

In particular embodiments, transportation management system 660 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 660 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 630 (which may belong to a ride requestor or provider), a transportation management system 660, vehicle system 640, or a third-party system 670 to process, transform, manage, retrieve, modify, add, or delete the information stored in the data store.

In particular embodiments, transportation management system 660 may include an authorization server (or any other suitable component(s)) that allows users 601 to opt-in to or opt-out of having their information and actions logged, recorded, or sensed by transportation management system 660 or shared with other systems (e.g., third-party systems 670). In particular embodiments, a user 601 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 601 of transportation management system 660 through blocking, data hashing, anonymization, or other suitable techniques as appropriate.

In particular embodiments, third-party system 670 may be a network-addressable computing system that may provide HD maps or host GPS maps, customer reviews, music or content, weather information, or any other suitable type of information. Third-party system 670 may generate, store, receive, and send relevant data, such as, for example, map data, customer review data from a customer review website, weather data, or any other suitable type of data. Third-party system 670 may be accessed by the other computing entities of the network environment either directly or via network 610. For example, user device 630 may access the third-party system 670 via network 610, or via transportation management system 660. In the latter case, if credentials are required to access the third-party system 670, the user 601 may provide such information to the transportation management system 660, which may serve as a proxy for accessing content from the third-party system 670.

In particular embodiments, user device 630 may be a mobile computing device such as a smartphone, tablet computer, or laptop computer. User device 630 may include one or more processors (e.g., CPU, GPU), memory, and storage. An operating system and applications may be installed on the user device 630, such as, e.g., a transportation application associated with the transportation management system 660, applications associated with third-party systems 670, and applications associated with the operating system. User device 630 may include functionality for determining its location, direction, or orientation, based on integrated sensors such as GPS, compass, gyroscope, or accelerometer. User device 630 may also include wireless transceivers for wireless communication and may support wireless communication protocols such as Bluetooth, near-field communication (NFC), infrared (IR) communication, WI-FI, and 2G/3G/4G/LTE mobile communication standard. User device 630 may also include one or more cameras, scanners, touchscreens, microphones, speakers, and any other suitable input-output devices.

In particular embodiments, the vehicle 640 may be equipped with an array of sensors 644, a navigation system 646, and a ride-service computing device 648. In particular embodiments, a fleet of vehicles 640 may be managed by the transportation management system 660. The fleet of vehicles 640, in whole or in part, may be owned by the entity associated with the transportation management system 660, or they may be owned by a third-party entity relative to the transportation management system 660. In either case, the transportation management system 660 may control the operations of the vehicles 640, including, e.g., dispatching select vehicles 640 to fulfill ride requests, instructing the vehicles 640 to perform select operations (e.g., head to a service center or charging/fueling station, pull over, stop immediately, self-diagnose, lock/unlock compartments, change music station, change temperature, and any other suitable operations), and instructing the vehicles 640 to enter select operation modes (e.g., operate normally, drive at a reduced speed, drive under the command of human operators, and any other suitable operational modes).

In particular embodiments, the vehicles 640 may receive data from and transmit data to the transportation management system 660 and the third-party system 670. Examples of received data may include, e.g., instructions, new software or software updates, maps, 3D models, trained or untrained machine-learning models, location information (e.g., location of the ride requestor, the vehicle 640 itself, other vehicles 640, and target destinations such as service centers), navigation information, traffic information, weather information, entertainment content (e.g., music, video, and news) ride requestor information, ride information, and any other suitable information. Examples of data transmitted from the vehicle 640 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 640, passengers may send/receive data to the transportation management system 660 and third-party system 670), and any other suitable data.

In particular embodiments, vehicles 640 may also communicate with each other, including those managed and not managed by the transportation management system 660. For example, one vehicle 640 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) or over a network (e.g., the Internet or via the transportation management system 660 or third-party system 670), or both.

In particular embodiments, a vehicle 640 may obtain and process sensor/telemetry data. Such data may be captured by any suitable sensors. For example, the vehicle 640 may have a Light Detection and Ranging (LiDAR) sensor array of multiple LiDAR transceivers that are configured to rotate 360°, emitting pulsed laser light and measuring the reflected light from objects surrounding vehicle 640. In particular embodiments, LiDAR transmitting signals may be steered by use of a gated light valve, which may be a MEMs device that directs a light beam using the principle of light diffraction. Such a device may not use a gimbaled mirror to steer light beams in 360° around the vehicle. Rather, the gated light valve may direct the light beam into one of several optical fibers, which may be arranged such that the light beam may be directed to many discrete positions around the vehicle. Thus, data may be captured in 360° around the vehicle, but no rotating parts may be necessary. A LiDAR is an effective sensor for measuring distances to targets, and as such may be used to generate a three-dimensional (3D) model of the external environment of the vehicle 640. As an example and not by way of limitation, the 3D model may represent the external environment including objects such as other cars, curbs, debris, objects, and pedestrians up to a maximum range of the sensor arrangement (e.g., 50, 100, or 200 meters). As another example, the vehicle 640 may have optical cameras pointing in different directions. The cameras may be used for, e.g., recognizing roads, lane markings, street signs, traffic lights, police, other vehicles, and any other visible objects of interest. To enable the vehicle 640 to "see" at night, infrared cameras may be installed. In particular embodiments, the vehicle may be equipped with stereo vision for, e.g., spotting hazards such as pedestrians or tree branches on the road. As another example, the vehicle 640 may have radars for, e.g., detecting other vehicles and hazards afar. Furthermore, the vehicle 640 may have ultrasound equipment for, e.g., parking and obstacle detection. In addition to sensors enabling the vehicle 640 to detect, measure, and understand the external world around it, the vehicle 640 may further be equipped with sensors for detecting and self-diagnosing the vehicle's own state and condition. For example, the vehicle 640 may have wheel sensors for, e.g., measuring velocity; global positioning system (GPS) for, e.g., determining the vehicle's current geolocation; and inertial measurement units, accelerometers, gyroscopes, and odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, the vehicle 640 may build a 3D model of its surrounding based on data from its LiDAR, radar, sonar, and cameras, along with a pre-generated map obtained from the transportation management system 660 or the third-party system 670. Although sensors 644 appear in a particular location on the vehicle 640 in FIG. 6, sensors 644 may be located in any suitable location in or on the vehicle 640. Example locations for sensors include the front and rear bumpers, the doors, the front windshield, on the side panel, or any other suitable location.

In particular embodiments, the vehicle 640 may be equipped with a processing unit (e.g., one or more CPUs and GPUs), memory, and storage. The vehicle 640 may thus be equipped to perform a variety of computational and processing tasks, including processing the sensor data, extracting useful information, and operating accordingly. For example, based on images captured by its cameras and a machine-vision model, the vehicle 640 may identify particular types of objects captured by the images, such as pedestrians, other vehicles, lanes, curbs, and any other objects of interest.

In particular embodiments, the vehicle 640 may have a navigation system 646 responsible for safely navigating the vehicle 640. In particular embodiments, the navigation system 646 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 646 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 646 may use its determinations to control the vehicle 640 to operate in prescribed manners and to guide the vehicle 640 to its destinations without colliding into other objects. Although the physical embodiment of the navigation system 646 (e.g., the processing unit) appears in a particular location on the vehicle 640 in FIG. 6, navigation system 646 may be located in any suitable location in or on the vehicle 640. Example locations for navigation system 646 include inside the cabin or passenger compartment of the vehicle 640, near the engine/battery, near the front seats, rear seats, or in any other suitable location.

In particular embodiments, the vehicle 640 may be equipped with a ride-service computing device 648, which may be a tablet or any other suitable device installed by transportation management system 660 to allow the user to interact with the vehicle 640, transportation management system 660, other users 601, or third-party systems 670. In particular embodiments, installation of ride-service computing device 648 may be accomplished by placing the ride-service computing device 648 inside the vehicle 640, and configuring it to communicate with the vehicle 640 via a wired or wireless connection (e.g., via Bluetooth). Although FIG. 6 illustrates a single ride-service computing device 648 at a particular location in the vehicle 640, the vehicle 640 may include several ride-service computing devices 648 in several different locations within the vehicle. As an example and not by way of limitation, the vehicle 640 may include four ride-service computing devices 648 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 648 may be detachable from any component of the vehicle 640. This may allow users to handle ride-service computing device 648 in a manner consistent with other tablet computing devices. As an example and not by way of limitation, a user may move ride-service computing device 648 to any location in the cabin or passenger compartment of the vehicle 640, may hold ride-service computing device 648, or handle ride-service computing device 648 in any other suitable manner. Although this disclosure describes providing a particular computing device in a particular manner, this disclosure contemplates providing any suitable computing device in any suitable manner.

Figure 7:
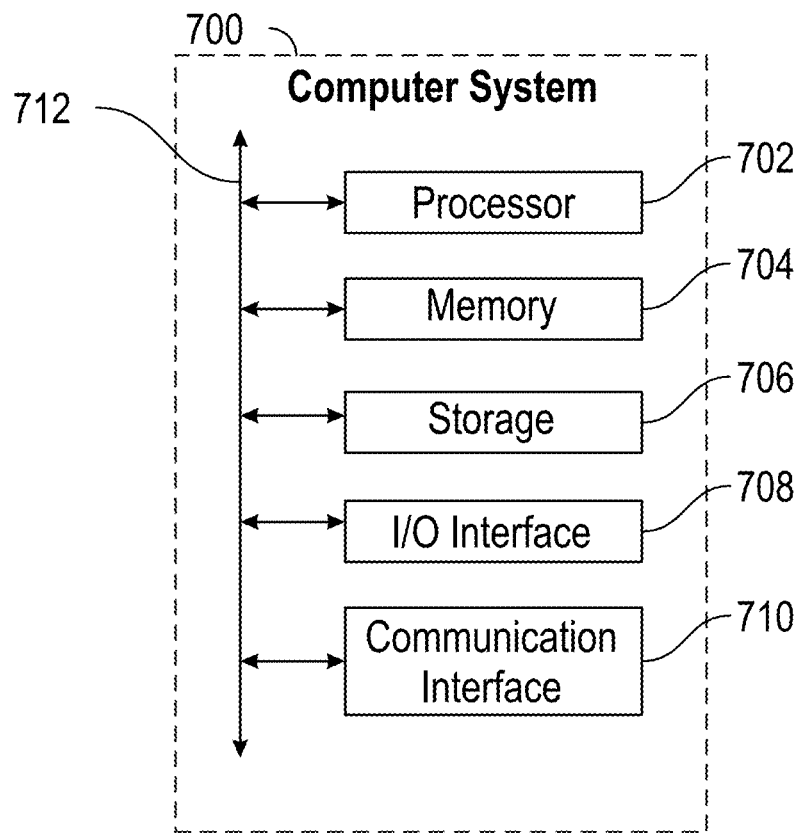
FIG. 7 illustrates an example of a computer system or computing device that can be utilized in various scenarios, according to an embodiment of the present technology.

FIG. 7 illustrates an example computer system 700. In particular embodiments, one or more computer systems 700 perform one or more steps of one or more methods described or illustrated herein. In particular embodiments, one or more computer systems 700 provide the functionalities described or illustrated herein. In particular embodiments, software running on one or more computer systems 700 performs one or more steps of one or more methods described or illustrated herein or provides the functionalities described or illustrated herein. Particular embodiments include one or more portions of one or more computer systems 700. Herein, a reference to a computer system may encompass a computing device, and vice versa, where appropriate. Moreover, a reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 that are to be operated on by computer instructions; the results of previous instructions executed by processor 702 that are accessible to subsequent instructions or for writing to memory 704 or storage 706; or any other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs), be a multi-core processor, or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described in further detail below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware or software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware or software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware or software, or both coupling components of computer system 700 to each other. As an example and not by way of limitation, bus 712 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A or B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Methods described herein may vary in accordance with the present disclosure. Various embodiments of this disclosure may repeat one or more steps of the methods described herein, where appropriate. Although this disclosure describes and illustrates particular steps of certain methods as occurring in a particular order, this disclosure contemplates any suitable steps of the methods occurring in any suitable order or in any combination which may include all, some, or none of the steps of the methods. Furthermore, although this disclosure may describe and illustrate particular components, devices, or systems carrying out particular steps of a method, this disclosure contemplates any suitable combination of any suitable components, devices, or systems carrying out any suitable steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method performed by a computing system, comprising:
 generating a computer simulation according to an environment of a vehicle;
 determining, within the computer simulation, contextual information associated with the environment including the vehicle and an agent with agent behavior constraints that are based on the contextual information;
 generating agent trajectories based on the contextual information and the agent behavior constraints and by using at least two models that are weighted, combined, and comprising naïve, heuristic, and/or machine learning models;

determining and selecting, from the agent trajectories, an agent trajectory that satisfies predetermined criteria;

monitoring, within the computer simulation, driving behavior of the vehicle in response to the vehicle interacting with the agent based on the agent trajectory; and controlling the vehicle in a real-world according to an ego trajectory embodied by the driving behavior of the vehicle that is monitored within the computer simulation.

2. The computer-implemented method of claim 1, further comprising:

generating one or more adaptations to an agent behavior within the computer simulation; and regenerating the computer simulation based on the agent and the one or more adaptations to the agent behavior that have been generated relative to the ego trajectory, wherein the determining and the selecting of the agent trajectory is further based on one or more scores associated with each of the agent trajectories following the computer simulation being regenerated, and wherein each score is determined at least partly based on whether the agent trajectory satisfies the predetermined criteria.

3. The computer-implemented method of claim 1, wherein the driving behavior of the vehicle that is monitored is based on generating one or more vehicle trajectories based on the vehicle interacting with the agent trajectory.

4. The computer-implemented method of claim 1, wherein the agent trajectories are further based on a desired driving behavior for the vehicle generated from collected sensor data from human driven vehicles.

5. The computer-implemented method of claim 1, wherein the computer simulation involves a change in the environment, wherein the agent behavior constraints change based on the change in the environment, and wherein the agent trajectories change based on the agent behavior constraints that have changed.

6. The computer-implemented method of claim 5, wherein the change in the environment is associated with an event in the environment, wherein the agent behavior constraints that have changed are based on the event, and wherein the agent trajectories that have changed are based on the event.

7. The computer-implemented method of claim 1, wherein the generating the computer simulation is based on instructions for control of the agent based on the agent trajectory and at least one of a movement of the agent and/or a position of the agent.

8. The computer-implemented method of claim 1, further comprising:

determining, by the computing system, performance of the vehicle based on performance criteria associated with the driving behavior of the vehicle that is monitored;

determining, by the computing system, whether the vehicle satisfies the performance criteria within the computer simulation;

identifying, by the computing system, the contextual information associated with whether the vehicle satisfies the performance criteria within the computer simulation; and regenerate, by the computing system, the computer simulation based on the agent and the contextual information that is determined to be associated with whether the vehicle satisfies the performance criteria within the computer simulation.

9. The computer-implemented method of claim 1, wherein the contextual information associated with the environment comprises at least one of: a boundary in the environment, an obstacle in the environment, and/or a limitation in the environment.

10. A system comprising:

at least one processor; and a memory storing instructions that, when executed by the at least one processor, cause the system to perform:

generating a computer simulation according to an environment of a vehicle;

determining, within the computer simulation, contextual information associated with the environment including the vehicle and at least one agent;

generating a set of trajectories for the at least one agent based on one or more behavior constraints for the at least one agent based on the contextual information, wherein the contextual information defines which models from a group are applied to generate the set of trajectories for the at least one agent, and wherein at least two of the models from the group applied to generate the set of trajectories for the at least one agent are weighted, combined, and selected from the group comprising: a naive agent model, a heuristic agent model, and a machine learning agent model;

selecting a trajectory for the at least one agent from the set of trajectories for the at least one agent based on determining that the trajectory for the at least one agent satisfies one or more predetermined criteria;

monitoring, within the computer simulation, driving behavior of the vehicle in response to the vehicle interacting with the at least one agent based on the trajectory for the at least one agent that is selected; and controlling the vehicle in a real-world according to an ego trajectory embodied by the driving behavior of the vehicle that is monitored within the computer simulation.

11. The system of claim 10, wherein the instructions further include instructions for:

generating one or more adaptations to one or more agent behaviors within the computer simulation; and regenerating the computer simulation based on the at least one agent and the one or more adaptations to the one or more agent behaviors that have been generated relative to the ego trajectory, wherein the selecting the trajectory for the at least one agent from the set of trajectories for the at least one agent is further based on one or more scores associated with each trajectory for the at least one agent of the set of trajectories for the at least one agent following the computer simulation being regenerated, and wherein each score is at least partly determined based on whether the trajectory for the at least one agent satisfies the one or more predetermined criteria.

12. The system of claim 10, wherein the driving behavior of the vehicle that is monitored is based on generating one or more trajectories for the vehicle based on the vehicle interacting with the trajectory for the at least one agent that is selected.

13. The system of claim 10, wherein the set of trajectories for the one or more agents are further based on contextual information and a desired driving behavior for the vehicle generated by collected sensor data from human driven vehicles.

14. A non-transitory computer-readable storage medium including instructions that, when executed by at least one processor of a computing system, cause the computing system to perform:
   generating a computer simulation according to an environment of a vehicle;
   determining, within the computer simulation, contextual information associated with the environment including the vehicle and at least one agent;
   generating a set of trajectories for the at least one agent based on one or more behavior constraints for the at least one agent based on the contextual information, wherein the contextual information defines which models from a group are applied to generate the set of trajectories for the at least one agent, and wherein at least two of the models from the group applied to generate the set of trajectories for the at least one agent are weighted, combined, and selected from the group comprising: a naive agent model, a heuristic agent model, and a machine learning agent model;
   selecting a trajectory for the at least one agent from the set of trajectories for the at least one agent based on determining that the trajectory for the at least one agent satisfies one or more predetermined criteria;
   monitoring, within the computer simulation, driving behavior of the vehicle in response to the vehicle interacting with the at least one agent based on the trajectory for the at least one agent that is selected; and
   controlling the vehicle in a real-world according to an ego trajectory embodied by the driving behavior of the vehicle that is monitored within the computer simulation.

15. The non-transitory computer-readable storage medium of claim 14, wherein the selecting the trajectory for the one or more agents from the set of trajectories for the one or more agents is further based on one or more scores associated with each trajectory for the one or more agents of the set of trajectories for the one or more agents, and
   wherein each score is determined at least partly based on whether the trajectory for the one or more agents satisfies the one or more predetermined criteria.

16. The non-transitory computer-readable storage medium of claim 14, wherein the driving behavior of the vehicle that is monitored is based on generating one or more trajectories for the vehicle based on the vehicle interacting with the trajectory for the at least one agent that is selected.

17. The non-transitory computer-readable storage medium of claim 14,
   wherein the set of trajectories for the one or more agents are further based on contextual information and a desired driving behavior for the vehicle generated by collected sensor data from human driven vehicles.

* * * * *